(12) United States Patent
Babin

(10) Patent No.: US 9,327,436 B2
(45) Date of Patent: May 3, 2016

(54) STACK MOLD TRANSFER DEVICE

(71) Applicant: Mold-Masters (2007) Limited, Georgetown (CA)

(72) Inventor: Denis Babin, Georgetown (CA)

(73) Assignee: Mold-Masters (2007) Limited, Georgetown, ON (CA)

( * ) Notice: Subject to any disclaimer, the term of this patent is extended or adjusted under 35 U.S.C. 154(b) by 253 days.

(21) Appl. No.: 13/721,265

(22) Filed: Dec. 20, 2012

(65) Prior Publication Data

US 2014/0178525 A1    Jun. 26, 2014

(51) Int. Cl.
   *B29C 45/32*   (2006.01)
   *B29C 45/17*   (2006.01)
   *B29C 45/27*   (2006.01)
   *B29C 45/23*   (2006.01)

(52) U.S. Cl.
   CPC ........... *B29C 45/322* (2013.01); *B29C 45/1769* (2013.01); *B29C 45/32* (2013.01); *B29C 2045/237* (2013.01); *B29C 2045/2759* (2013.01)

(58) Field of Classification Search
   CPC .. B29C 45/18; B29C 45/23; B29C 2045/237; B29C 45/00; B29C 45/169; B29C 45/20; B29C 49/4205; B29C 2045/2759; B29C 45/231; B29C 45/232; B29C 45/234; B29C 2045/235; B29C 2045/238; B29C 45/322
   USPC ........ 425/542, 562, 563, 564, 572; 264/328.8
   See application file for complete search history.

(56) References Cited

U.S. PATENT DOCUMENTS

| | | | |
|---|---|---|---|
| 4,212,626 A | 7/1980 | Gellert | |
| 5,162,230 A * | 11/1992 | Ziegler et al. | 425/533 |
| 6,348,171 B1 | 2/2002 | Dewar et al. | |
| 6,409,955 B1 | 6/2002 | Schmitt et al. | |
| 6,811,393 B2 * | 11/2004 | Rick | 425/562 |

(Continued)

FOREIGN PATENT DOCUMENTS

| | | |
|---|---|---|
| CN | 201208791 | 3/2009 |
| EP | 1419869 | 5/2004 |

(Continued)

OTHER PUBLICATIONS

Fairy, Fabrice. Exhibit A (From U.S. Pat. No. 7,303,720).*

(Continued)

*Primary Examiner* — James Sanders
*Assistant Examiner* — Leith S Shafi
(74) *Attorney, Agent, or Firm* — Medler Ferro Woodhouse & Mills PLLC

(57) ABSTRACT

Stack mold transfer device are disclosed that include first and second transfer members having respective first and second transfer channels, first and second valve seats, and first and second valve members. The first valve member defining a flow portion and a first sealing surface and the second valve member defining a second sealing surface and a receiving pocket. When the first and second transfer members are in an engaged configuration, the first and second transfer channels form a common transfer channel. When the transfer device is in a closed-flow configuration, the flow of molding material is blocked, and when the transfer device is in an open-flow configuration, the first sealing surface of the first valve member is slidably received in the receiving pocket of the second valve member and the flow portion of the first valve member is positioned to allow molding material flow within the common transfer channel.

24 Claims, 20 Drawing Sheets

(56) References Cited

U.S. PATENT DOCUMENTS

| | | |
|---|---|---|
| 6,835,060 B2 | 12/2004 | Sicilia |
| 6,955,534 B2 | 10/2005 | Dewar |
| 7,261,553 B2 | 8/2007 | Ciccone et al. |
| 7,287,549 B2 * | 10/2007 | Rick .......................... 137/614 |
| 7,303,720 B2 * | 12/2007 | Fairy ......................... 264/328.8 |
| 7,416,402 B2 | 8/2008 | Babin |
| 2002/0121713 A1 | 9/2002 | Moss et al. |
| 2008/0138455 A1 * | 6/2008 | Hutchinson et al. ......... 425/72.1 |

FOREIGN PATENT DOCUMENTS

| | | |
|---|---|---|
| EP | 1419869 A1 * | 5/2004 |
| FR | 2152932 | 4/1973 |
| FR | 2831644 | 5/2003 |
| KR | 213664 | 8/1999 |
| WO | WO-2004/062880 | 7/2004 |
| WO | WO-2007/052869 | 5/2007 |
| WO | WO 2007052869 A1 * | 5/2007 |
| WO | WO-2011/128747 | 10/2011 |

OTHER PUBLICATIONS

Exhibit B. Fig. 6 of U.S. Pat. No. 7,303,720.*

Exhibit C. Fig. 4 of U.S. Pat. No. 7,202,720.*

* cited by examiner

STACK MOLD TRANSFER DEVICE

FIELD OF THE INVENTION

The present disclosure relates to injection molding apparatus, and more particularly to stack injection molding apparatus.

BACKGROUND OF THE INVENTION

Stack injection molding is a process by which molding output can be increased by arranging mold cavities in a back-to-back manner in an injection molding apparatus having two or more parting lines. In order to deliver molding material to the mold cavities of a stack mold, the molding material is transferred from the molding machine across a parting line defined between a stationary side and a moving center section of the molding apparatus to a hot runner system that is disposed within the moving center section.

Various solutions have been proposed for transferring the molding material across the parting line of a stack mold to the hot runner system. For example, a sprue bar that travels with the moving center section as the mold is opened and closed during the injection cycle can be coupled to the hot runner system to extend across the parting line to interface with the machine nozzle; however when the mold is opened the sprue bar is disengaged from the molding machine nozzle and provisions must be made to prevent the molding machine nozzle and the sprue bar from 'drooling' molding material. Further in some instances, on opening of the molding apparatus, the sprue bar remains between the separated parting surfaces and becomes a potential obstacle to newly molded article that are being ejected from the molding apparatus.

Valve to valve molding material transfer systems are known that offer another solution for transferring the molding material across the parting line of a stack mold to the hot runner system in which a first valve transfer member is fixed relative to the stationary side of the molding apparatus and a second valve transfer member is fixed to the hot runner system in the moving center section. When the stack molding system is closed, the first and second transfer members are engaged and the valves in each transfer member can be positioned to allow melt to flow across the parting line from the molding machine nozzle through the first transfer member to the second transfer member and into the hot runner system. Conversely, when the stack molding apparatus is opened, the transfer members are separated from each other to allow for an obstacle free drop area for the newly molded articles that are being ejected from the molding apparatus and the valves can be positioned to prevent the flow of molding material. In such systems it is common for a molding material to build-up between the engaging surfaces of the transfer members.

As such, a need exists in the art to overcome some of the problems associated with known solutions for transferring melt across a parting line of a stack mold.

BRIEF SUMMARY OF THE INVENTION

Embodiments hereof are directed to a stack mold transfer device for delivering molding material across a parting line in a stack mold. The transfer device includes a first transfer member that has a first transfer channel, a first valve seat, and a first valve member disposed within the first transfer channel. The first valve member includes a flow portion and a first valve sealing surface. A second transfer member has a second transfer channel, a second valve seat, and a second valve member disposed within the second transfer channel. The second valve member includes a second valve sealing surface and a receiving pocket. The first transfer member and the second transfer member, in an engaged configuration form a common transfer channel from the first and second transfer channels. When the transfer device is in the closed-flow configuration, the flow of molding material within the common transfer channel is blocked, and when the transfer device is in the open-flow configuration the first valve sealing surface that surrounds a downstream end of the first valve member is slidably received in the receiving pocket and the flow portion is positioned to allow molding material to flow within the common transfer channel.

BRIEF DESCRIPTION OF THE DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE DRAWINGS

Specific embodiments of the present invention are now described with reference to the figures, wherein like reference numbers indicate identical or functionally similar elements. The following detailed description is merely exemplary in nature and is not intended to limit the invention or the application and uses of the invention. In the following description, "downstream" is used with reference to the direction of mold material flow from an injection unit of an injection molding machine to a mold cavity of an injection molding system, and also with reference to the order of components or features thereof through which the mold material flows from the injection unit to the mold cavity, whereas "upstream" is used with reference to the opposite direction. Although the description of embodiments hereof is in the context of a hot runner injection molding system, the invention may also be used in other molding applications where it is deemed useful, non-limiting examples of which include molding of thermoset resins such as liquid silicone rubber or the like. Furthermore, there is no intention to be bound by any expressed or implied theory presented in the preceding technical field, background, brief summary or the following detailed description.

Figure 1A:
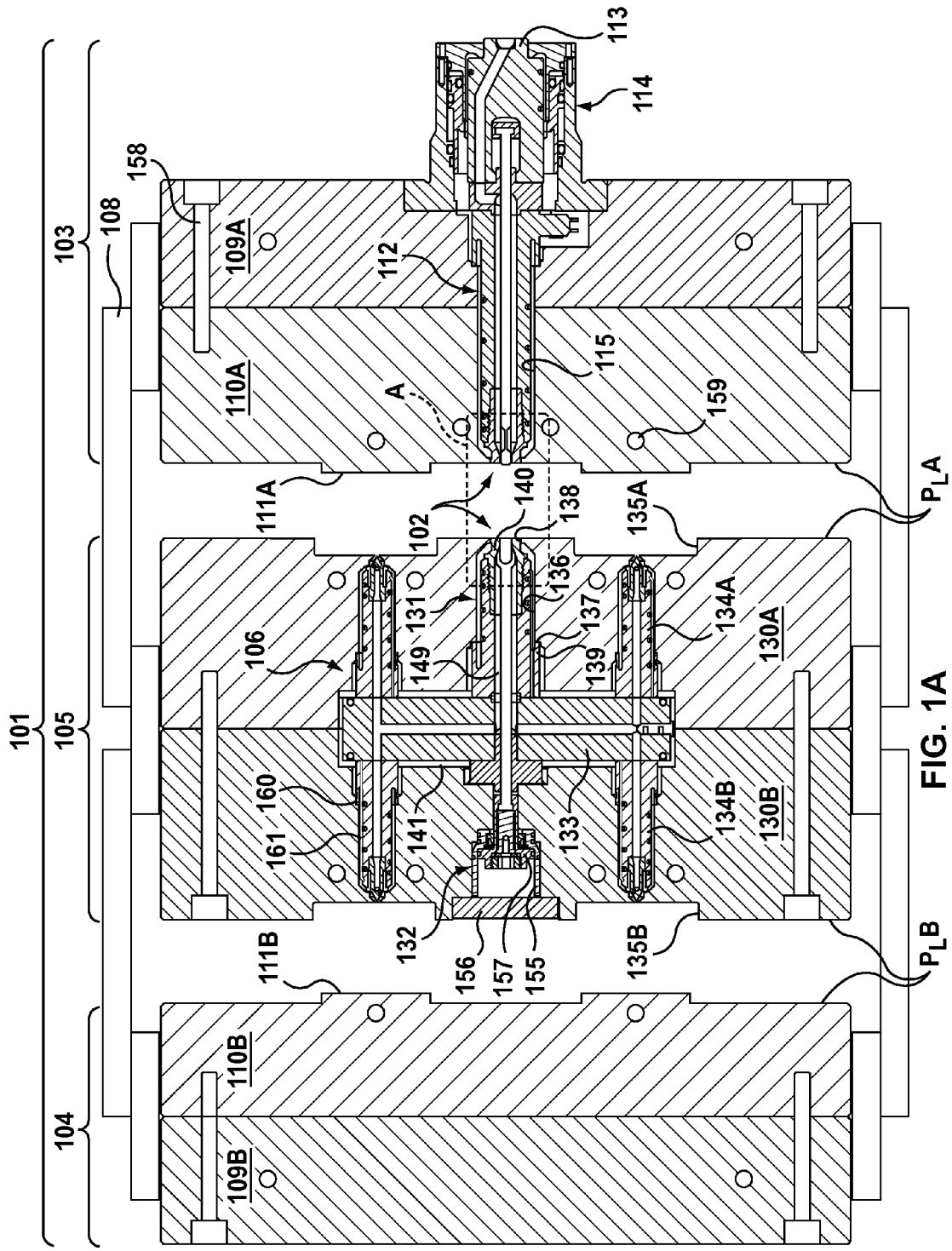
FIG. 1A is a sectional view of a stack molding apparatus in a mold-open configuration and having a transfer device in accordance with an embodiment hereof.
Figure 1B:
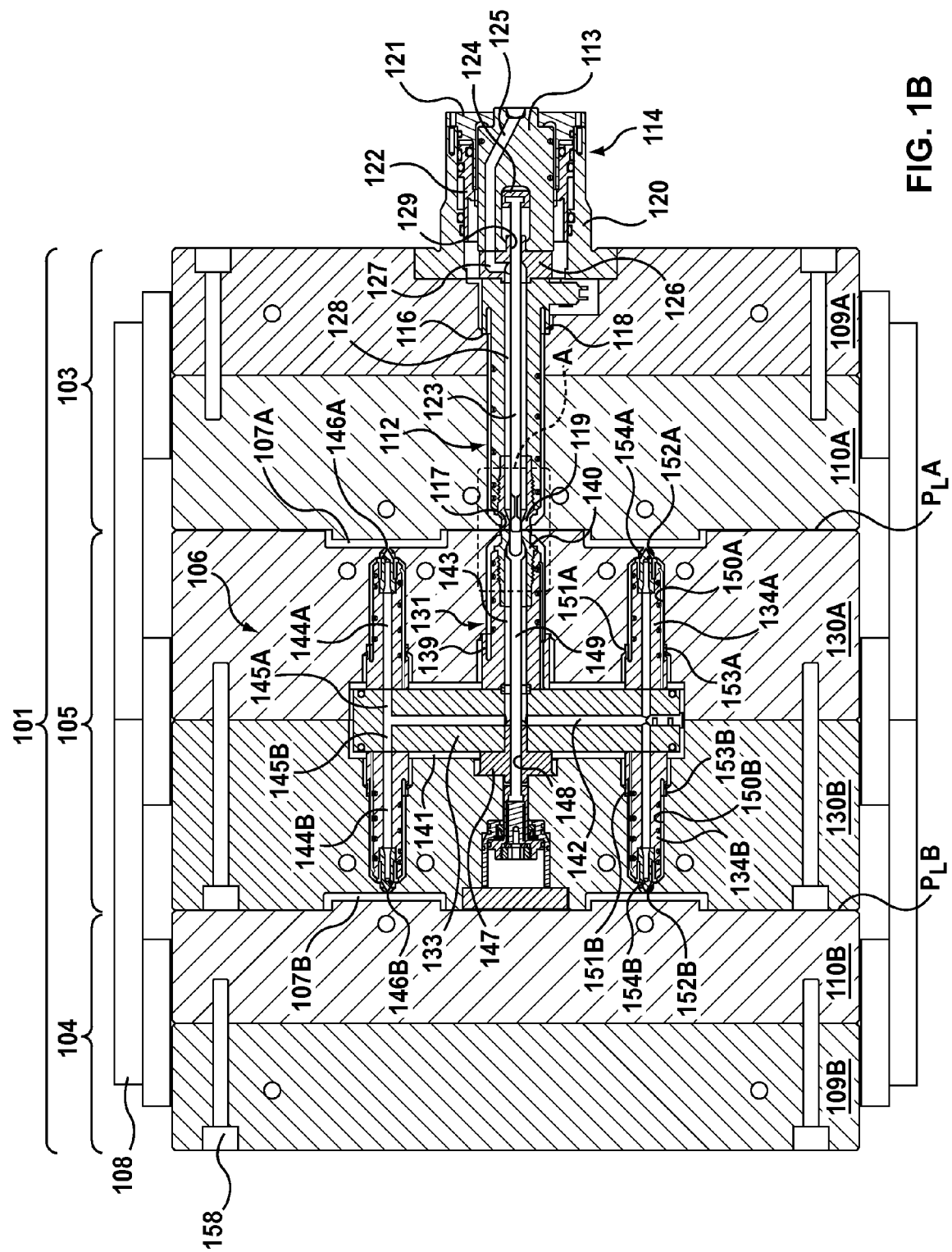
FIG. 1B is the stack molding apparatus of FIG. 1A in an mold-closed configuration

FIG. 1A is a sectional view of a stack molding apparatus 101 in a mold-open configuration and having a transfer device 102 in accordance with an embodiment hereof and FIG. 1B is the stack molding apparatus 101 of FIG. 1A in a mold-closed configuration. Stack molding apparatus 101 includes a stationary side 103, a moving side 104, a moving center section 105 between stationary side 103 and moving side 104, and transfer device 102 for delivering molding material to a hot runner system 106 housed in moving center section 105. Stack molding apparatus 101 is configured for mounting between the platens of an injection molding machine (not shown), with stationary side 103 mounted to the stationary platen, moving side 104 mounted to the moving platen, and moving center section 105 mounted to a moving center section support between the stationary platen and the moving platen. In the current embodiment, stack molding apparatus 101 is a two level stack molding apparatus having a parting line $P_L A$ defined between stationary side 103 and moving center section 105 and a parting line $P_L B$ defined between moving center section 105 and moving side 104 such that when stack molding apparatus 101 is in the mold-closed configuration, as shown in FIG. 1B, mold cavities 107A, 107B are defined between stationary side 103, moving center section 105, and moving side 104.

As would be understood by one of ordinary skill in the art, a centering mechanism 108 couples stationary side 103, moving side 104, and moving center section 105 together and maintains relative spacing therebetween when stack molding apparatus 101 is translated between the mold-open configuration as shown in FIG. 1A and the mold-closed configuration as shown in FIG. 1B.

Stationary side 103 includes a back plate 109A and a core plate 110A. Stationary side 103 is coupled to the stationary platen of the injection molding machine via back plate 109A. Core plate 110A includes cores 111A which define the inside surface of the molded articles created by mold cavities 107A. In the current embodiment, cores 111A are depicted as being integral with core plate 110A by way of example and not limitation. In an embodiment (not shown), cores 111A are defined by core inserts which are coupled to core plate 110A. Stationary side 103 further includes a first transfer member 112, an inlet member 113 and an actuator 114. In an embodiment first transfer member 112 may be referred to as a first transfer nozzle 112. A bore 115 extends through back plate 109A and core plate 110A in which first transfer member 112 is disposed. Bore 115 is sized to create an insulating air space between first transfer member 112 and both back plate 109A and core plate 110A, and further defines a shoulder 116 and a first transfer seal bore 117. Shoulder 116 locates and supports first transfer member 112 within stationary side 103 via a flange 118 located proximate an upstream end of first transfer member 112 whereas first transfer seal bore 117 locates a downstream end of first transfer member 112 relative to core plate 110A via a first transfer seal 119. First transfer seal 119 is depicted as a separate component by way of example and not limitation. In an embodiment (not shown) first transfer seal 119 is integral with first transfer member 112.

Actuator 114 includes a housing 120, which is coupled to back plate 109A, a cap 121, and a piston 122. Piston 122 and inlet member 113 are arranged within housing 120 with piston 122 being slidably disposed within housing 120 and coupled to a first valve member 123 via a connector 124. First valve member 123, which, in an embodiment, may be referred to as a valve pin or a valve stem, is actuatable between an open-flow position and a closed-flow position upon actuation of piston 122. Inlet member 113 defines an inlet channel 125 that interfaces with a molding machine nozzle (not shown) for receiving a pressurized stream of molding material. A valve bushing 126 is sandwiched between first transfer member 112 and inlet member 113. Valve bushing 126 defines a valve bushing channel 127 which is in fluid communication at an upstream end with inlet channel 125 and at a downstream end with a first transfer channel 128 in first transfer member 112. Valve bushing 126 further defines a guide bore 129 through which first valve member 123 slides when first valve member 123 is translated. Cap 121 is coupled to a rearward end of housing 120, and provides a surface upon which inlet member 113 bears pressure in order to transmit force created by heat expansion of inlet member 113 to valve bushing 126 and to first transfer member 112 to create a fluid seal therebetween. In an alternate embodiment (not shown), a fluid seal is maintained between inlet member 113, valve bushing 126, and first transfer member 112 by connecting inlet member 113, valve bushing 126 and first transfer member 112 together with socket head cap screws or the like.

In the current embodiment, actuator 114 may be referred to as an in-line actuator since first valve member 123 is coaxial with the molding machine nozzle; however, this specific type of actuator is shown by way of example and not limitation as any type of actuator that can translate first valve member 123 between an open-flow position and a closed-flow position may be adapted for use herein.

Moving side 104 includes a back plate 109B and a core plate 110B, and is coupled to the moving platen of the injection molding machine via back plate 109B. Core plate 110B includes cores 111B which define the inside surface of the molded articles created by mold cavities 107B. In the current embodiment, cores 111B are depicted as being integral with core plate 110B by way of example and not limitation. In another embodiment (not shown), cores 111B are defined by core inserts which are coupled to core plate 110B. Core plate 110B and core plate 110A may further include a molded article ejection means (not shown) such as pneumatic part ejection channels, ejector pins, stripper rings, or the like.

Moving center section 105 includes a cavity plate 130A, a cavity plate 130B, a second transfer member 131, an actuator 132, and hot runner system 106 which includes inter alia, a manifold 133 and a plurality of nozzles 134A, 134B. In an embodiment second transfer member 131 may be referred to as a second transfer nozzle 131. Cavity plates 130A, 130B include cavities 135A, 135B, which define the outside surface of the molded article created by a respective mold cavity 107A, 107B. In the current embodiment, cavities 135A, 135B are depicted as being integral with respective cavity plates 130A, 130B by way of example and not limitation. In another embodiment (not shown), cavities 135A, 135B are defined by cavity inserts that are coupled to respective cavity plates 130A, 130B.

A bore 136 extends through cavity plate 130A in which second transfer member 131 is disposed. Bore 136 is sized to create an insulating air space between second transfer member 131 and cavity plate 130A, and further defines a shoulder 137 and a second transfer seal bore 138. Shoulder 137 locates and supports second transfer member 131 within moving center section 105 via a flange 139 located proximate a downstream end of second transfer member 131 whereas second transfer seal bore 138 locates an upstream end of second transfer member 131 relative to cavity plate 130A via a second transfer seal 140. Second transfer seal 140 is depicted as separate from second transfer member 131 by way of example and not limitation. In an embodiment (not shown), second transfer seal 140 is integral with second transfer member 131.

Manifold 133 is positioned between nozzles 134A and nozzles 134B and is surrounded by a pocket 141 which is defined between cavity plate 130A and cavity plate 130B. Pocket 141 is sized to create an insulating air space between manifold 133 and cavity plates 130A, 130B. A manifold channel 142 is provided in manifold 133 to deliver the stream of molding material from a second transfer channel 143 in second transfer member 131 to nozzle channels 144A defined by nozzles 134A and to nozzle channels 144B defined by nozzles 134B via a respective manifold outlet 145A, 145B. Each nozzle 134A, 134B delivers the molding material from a respective manifold outlet 145A, 145B to mold cavities 107A, 107B via a gate 146A, 146B. A valve bushing 147 is positioned between manifold 133 and cavity plate 130B and defines a guide bore 148 through which a second valve member 149, which in an embodiment may be referred to as a valve pin or a valve stem, slides when second valve member 149 is translated.

Nozzle bores 150A, 150B extend through cavity plates 130A, 130B in which respective nozzles 134A, 134B are disposed. Nozzle bores 150A, 150B are sized to create an insulating air space between nozzles 134A, 134B and cavity plates 130A, 130B. Nozzle bores 150A, 150B further define shoulders 151A, 151B and a nozzle seal bores 152A, 152B. Shoulders 151A, 151B locate and support respective nozzles 134A, 134B within moving center section 105 via flanges 153A, 153B located proximate an upstream end of the respective nozzle 134A, 134B, whereas nozzle seal bores 152A, 152B locate a downstream end of the respective nozzle 134A, 134B relative to cavity plates 130A, 130B via nozzle seals 154A, 154B. Two piece nozzle seals 154A, 154B are shown by way of example and not limitation. In an alternate embodiment, (not shown), nozzle seals 154A, 154B include fewer than or more than two pieces. Nozzle seals 154A, 154B may also be referred to as nozzle tips.

During operation the flange and shoulder arrangement between nozzles 134A, 134B and respective cavity plates 130A, 130B allow the load created by thermal expansion of manifold 133 to bear upon flanges 153A, 153B to create a sealing force between manifold 133 and nozzles 134A and 134B. Similarly, thermal expansion of manifold 133 bears upon valve bushing 147 and second transfer member 131 to create a sealing force between manifold 133 and second transfer member 131.

Actuator 132 includes a housing 155, a cover 156, and a piston 157 slidably disposed within housing 155 and coupled to second valve member 149. Second valve member 149 is actuatable between an open-flow position and a closed-flow position upon actuation of piston 157. Cover 156 is coupled to cavity plate 130B at an open end of housing 155. Cover 156 provides a fluid seal which allows piston 157 to be actuated to the closed-flow position.

In the current embodiment back plates 109A, 109B and core plates 110A, 110B, and cavity plates 130A, 130B, which may be referred to as mold plates, are coupled together by socket head cap screws 158 or the like and may include, inter alia, additional mold plates and fastening/aligning features such as dowels, taper locks, or the like. Back plates 109A, 109B; core plates 110A, 110B; and cavity plates 130A, 130B also include cooling channels 159 in fluid communication with a fluid source (not shown) for maintaining stack molding apparatus 101 at a required molding temperature.

In the current embodiment, each of inlet member 113, first and second transfer members 112, 131, manifold 133, and nozzles 134A, 134B is provided with a heater and a thermocouple, such as heater 160 and thermocouple 161 called out on nozzle 134B in FIG. 1A, which, in conjunction with a temperature controller (not shown), maintains each of inlet member 113, first and second transfer members 112, 131, manifold 133, and nozzles 134A, 134B at a required processing temperature. The number and type of heaters shown is by way of example and not limitation. In an alternate embodiment (not shown) only some of inlet member 113, first and second transfer members 112, 131, manifold 133, and nozzles 134A, 134B are provided with a heater and/or a thermocouple.

Figure 2A:
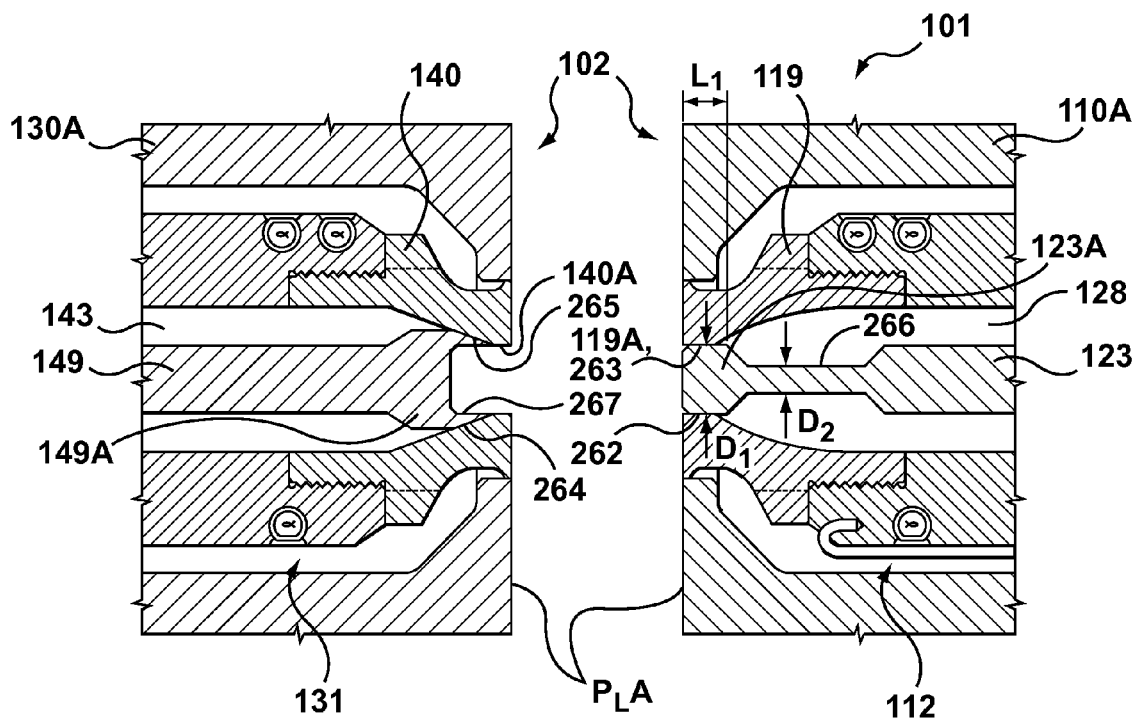
FIGS. 2A-2C are enlarged views of a transfer area A of the stack molding apparatus of FIGS. 1A and 1B.
Figure 2B:
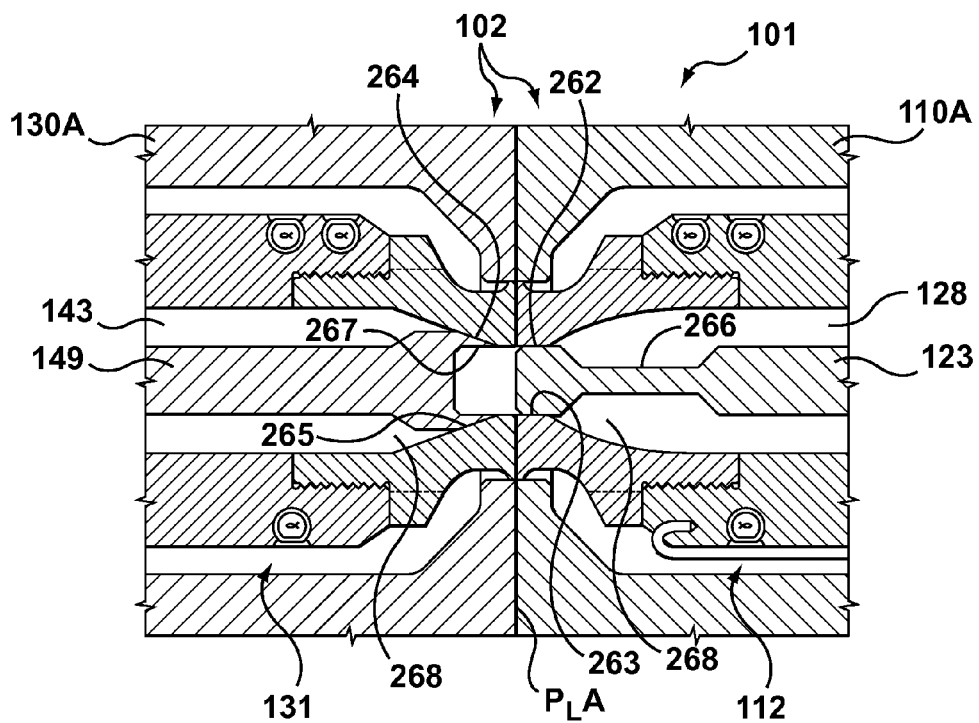
Figure 2C:
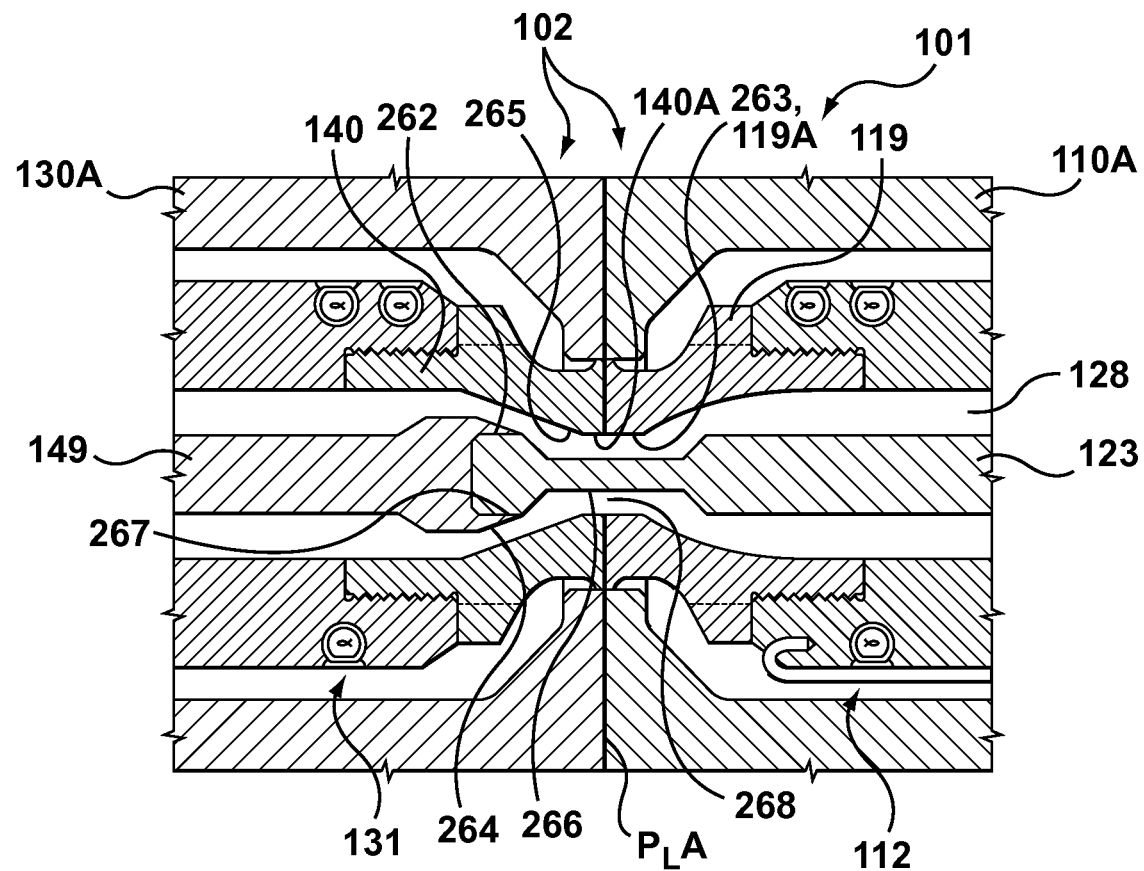

FIGS. 2A-2C are enlarged views of a transfer area A of stack molding apparatus 101, which is shown delineated by dashed lines in FIGS. 1A and 1B. FIG. 2A depicts stack molding apparatus 101 in the mold-open configuration of FIG. 1A with transfer device 102 in a closed-flow configuration, FIG. 2B depicts stack molding apparatus 101 in the mold-closed configuration of FIG. 1B with transfer device 102 in the closed-flow configuration, and FIG. 2C depicts stack molding apparatus 101 in the mold-closed configuration of FIG. 1B with transfer device 102 in an open-flow configuration. It should be apparent by comparing FIGS. 1A and 1B with FIGS. 2A and 2B that transfer device 102 is shown in the closed-flow configuration in each of FIGS. 1A and 1B.

As discussed above, first valve member 123 and second valve member 149 are translatable between the closed-flow position, and the open-flow position. When first valve member 123 is in the closed-flow position, as shown in FIGS. 2A and 2B, a first valve sealing surface 262 of a downstream end 123a of first valve member 123 engages a first valve seat 263 defined by an outlet bore 119a of transfer seal 119, and when first valve member 123 is in the open-flow position, as shown in FIG. 2C, first valve sealing surface 262 is disengaged from first valve seat 263 and disposed downstream thereof, as explained in more detail below. When second valve member 149 is in a closed-flow position, as shown in FIGS. 2A and 2B, a second valve sealing surface 264 of an upstream end 149a of second valve member 149 engages a second valve seat 265 defined by transfer seal 140, and when second valve member 149 is in an open-flow position, as shown in FIG. 2C, second valve sealing surface 264 is disengaged from second valve seat 265 and disposed downstream thereof, as explained in more detail below. Accordingly, transfer device 102 is actuatable between a closed-flow configuration, that is, when at least one of first valve member 123 and second valve member 149 is in the closed-flow position, as depicted in FIGS. 2A and 2B, and an open-flow configuration, when first valve member 123 and second valve member 149 are in the open-flow position as depicted in FIG. 2C.

Transfer device 102 includes first transfer member 112 and second transfer member 131. First transfer member 112 includes first transfer channel 128, transfer seal 119 that defines first valve seat 263, and first valve member 123, which is disposed within first transfer channel 128. First valve member 123 has a flow portion 266 and first valve sealing surface 262. Second transfer member 131 includes second transfer channel 143, transfer seal 140 that defines second valve seat 265, and second valve member 149, which is disposed within second transfer channel 143. Second valve member 149 has second valve sealing surface 264 and a receiving pocket 267 defined within upstream end 149a thereof. When first transfer member 112 and second transfer member 131 are in an engaged configuration, such as depicted in FIGS. 2B and 2C, they combine to form a common transfer channel 268 that includes first and second transfer channels 128, 143.

In the embodiment of FIGS. 2A-2C, first valve sealing surface 262 is defined by an outer surface of downstream end 123a of first valve member 123. Downstream end 123a of first valve member 123 has a cylindrical shape of a length $L_1$ and a diameter $D_1$ that is sized to be received within receiving pocket 267, which has a complementing depth to fully receive downstream end 123a therein (as shown in FIG. 2C) and an inner diameter that permits a sliding relationship therebetween. The sliding overlapping engagement between first valve sealing surface 262, which surrounds the first valve member downstream end 123a, and receiving pocket 267 creates a longitudinally extending and circumferential sealing area therebetween, as discussed below. Diameter $D_1$ of downstream end 123a of first valve member 123 is also substantially equal to an inner diameter of outlet bore 119a of transfer seal 119 that defines first valve seat 263 along a length of outlet bore 119a so as to provide a sealing relationship between first valve sealing surface 262 and first valve seat 263 when first valve member 123 is engaged with transfer seal 119. Flow portion 266 of first valve member 123 is defined by a narrowed or necked portion of first valve member 123 and has a diameter $D_2$ that is smaller than the diameter $D_1$ of downstream end 123a of first valve member 123. Second valve sealing surface 264 is a tapered inner surface of transfer seal 140 that is downstream of an inlet bore 140a thereof, with second valve seat 265 being a corresponding tapered outer surface of upstream end 149a of second valve member 149 so as to provide a sealing relationship between second valve sealing surface 264 and second valve seat 265 when second valve member 149 is engaged with transfer seal 140.

When transfer device 102 is in the closed-flow configuration, as depicted in FIG. 2B, first valve sealing surface 262 engages first valve seat 263 and second valve sealing surface 264 engages second valve seat 265 to block the flow of molding material within common transfer channel 268, and when transfer device 102 is in the open-flow configuration, as depicted in FIG. 2C, first valve sealing surface 262 is disengaged from first valve seat 263 and second valve sealing surface 264 is disengaged from second valve seat 265 such that first valve sealing surface 262 is slidably received in receiving pocket 267, and flow portion 266 is positioned to allow molding material to flow within common transfer channel 268. More particularly, when first valve member 123 is in the closed-flow position, first valve sealing surface 262 is sealingly engaged with first valve seat 263 and flow portion 266 is positioned within first transfer channel 128. As first valve member 123 is translated downstream to its open-flow position and engaged with second valve member 149, first valve sealing surface 262 of downstream end 123a slides downstream of first valve sealing surface 263 to mate with and slide within receiving pocket 267 of second valve member 149. Once first valve sealing surface 262 of downstream end 123a has begun to slide within receiving pocket 267, second valve member 149 is also translated downstream to its open-flow position, retracting second valve sealing surface 264 of upstream end 149a from second valve seat 265. When each of first valve member 123 and second valve member 149 is in its respective open-flow positions, as shown in FIG. 2C, flow portion 266 extends between first transfer channel 128 and second transfer channel 143 to establish fluid communication therebetween. In the open-flow position shown in FIG. 2C, first and second transfer channels 128, 143 may be described as forming common transfer channel 268 to thereby allow molding material to flow across parting line $P_LA$.

In operation, at the beginning of the molding cycle the stationary and moving platens of the molding machine are separated, stack molding apparatus 101 is in the mold-open configuration, transfer device 102 is in the disengaged configuration, and first and second valve members 123,149 are in the closed-flow position such that transfer device 102 is also in the closed-flow configuration. Stationary platen and moving platen of injection the injection molding machine are brought together and stationary side 103, moving side 104, and moving center section 105 are urged together such that stack molding apparatus 101 is in the mold-closed configuration and transfer device 102 is in the engaged configuration. First valve member 123 and second valve member 149 are translated to their respective open-flow positions with downstream end 123a of first valve member 123 being slidably received within receiving pocket 267 such that transfer device 102 is in the open-flow configuration. The injection molding machine delivers a shot of molding material to stack molding apparatus 101 through inlet channel 125, valve bushing channel 127, and into first transfer member channel 128. The molding material then crosses parting line $P_LA$ via common transfer channel 268 and flows from second transfer member 131, through manifold channel 142, nozzle channels 144A, 144B, and into respective mold cavities 107A, 107B via gates 146A, 146B. Once mold cavities 107A, 107B are sufficiently packed with molding material, first valve member 123 and second valve member 149 are translated to their respective closed-flow positions during which downstream end 123*a* of first valve member 123 is slidably withdrawn from receiving pocket 267 of upstream end 149*a* of second valve member 149. With each of first valve member 123 and second valve member 149 in their respective closed-flow positions transfer device 102 is in the closed-flow configuration. Stationary platen and moving platen are then separated, thus separating stationary side 103 moving side 104 and moving center section 105 such that stack molding apparatus 101 is now in the mold-open configuration and transfer device is in the disengaged configuration. Newly molded articles can now be ejected from stack molding apparatus 101 before the molding cycle begins again.

In known transfer devices for stack molding applications, separation of the valve members during injection of molding material, or during actuation of the valve members may cause a buildup of stagnant molding material to occur between the contacting surfaces of the valve members, which are configured to provide a face seal therebetween, and/or at the parting surfaces of the stack molding apparatus. Such build-up of molding material between the contacting surfaces of the valve members may prevent them from being translated to their respective closed-flow positions such that a proper face seal is lacking therebetween thus resulting in a leakage of molding material at the parting line $P_LA$. Such leakage may reduce molding output since the build-up of molding material may prevent a complete closing of parting line $P_LA$, and thereafter result in deficient molded articles being produced with undesirable, so called, 'flash'.

Unlike known transfer devices having valve members that contact one another only along a face seal, the sliding overlapping engagement between first valve sealing surface 262, which surrounds the first valve member downstream end 123*a*, and receiving pocket 267 creates a longitudinally extending and circumferential sealing area between first valve member 123 and second valve member 149 that corresponds to the depth that first valve sealing surface 262, and consequently first valve member downstream end 123*a*, projects into receiving pocket 267. The sealing area created by the sliding overlapping engagement between downstream end 123*a* of first valve member 123 and receiving pocket 267 of upstream end 149*a* links the two valve members together in a male-female connection to thereby reduce the likelihood of first valve member 123 and second valve member becoming separated as a result of injection pressure when transfer device 102 is in the open-flow configuration such that pressurized molding material is delivered to stack molding apparatus 101. Further, in the current embodiment precise coordination of the actuation timing of first and second valve members 123, 149 is not necessary or less crucial when first and second valve members 123, 149 are translated from their respective open-flow positions to their respective closed-flow positions because the longitudinally extending and circumferential sealing area between first valve sealing surface 262 and receiving pocket 267 allows for an amount of linear movement of first valve member 123 relative to second valve member 149 that corresponds to the depth that downstream end 123*a* projects into receiving pocket 267 while still maintaining engagement therebetween.

Figure 3A:
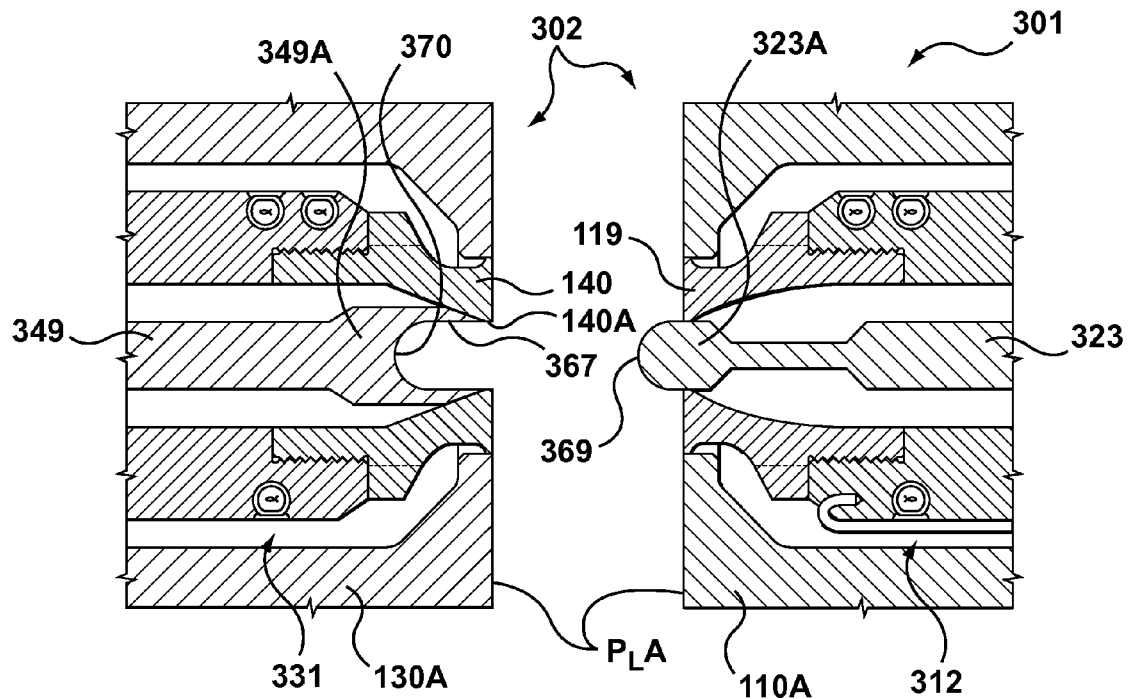
FIGS. 3A to 3C are sectional views of a transfer area A of a stack molding apparatus having a transfer device in accordance with another embodiment hereof.
Figure 3B:
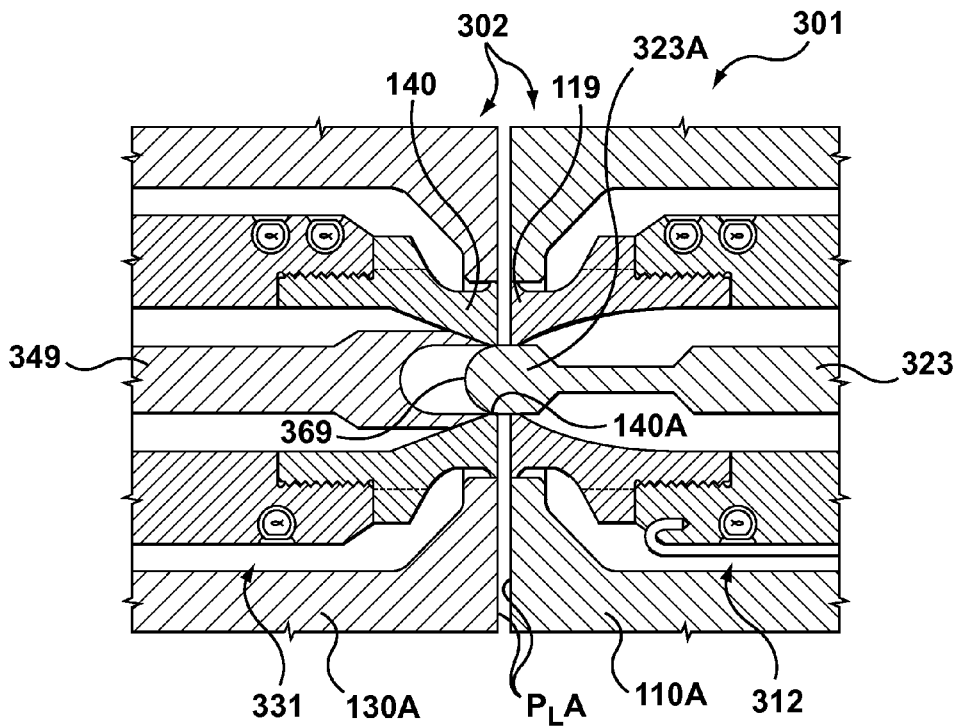
Figure 3C:
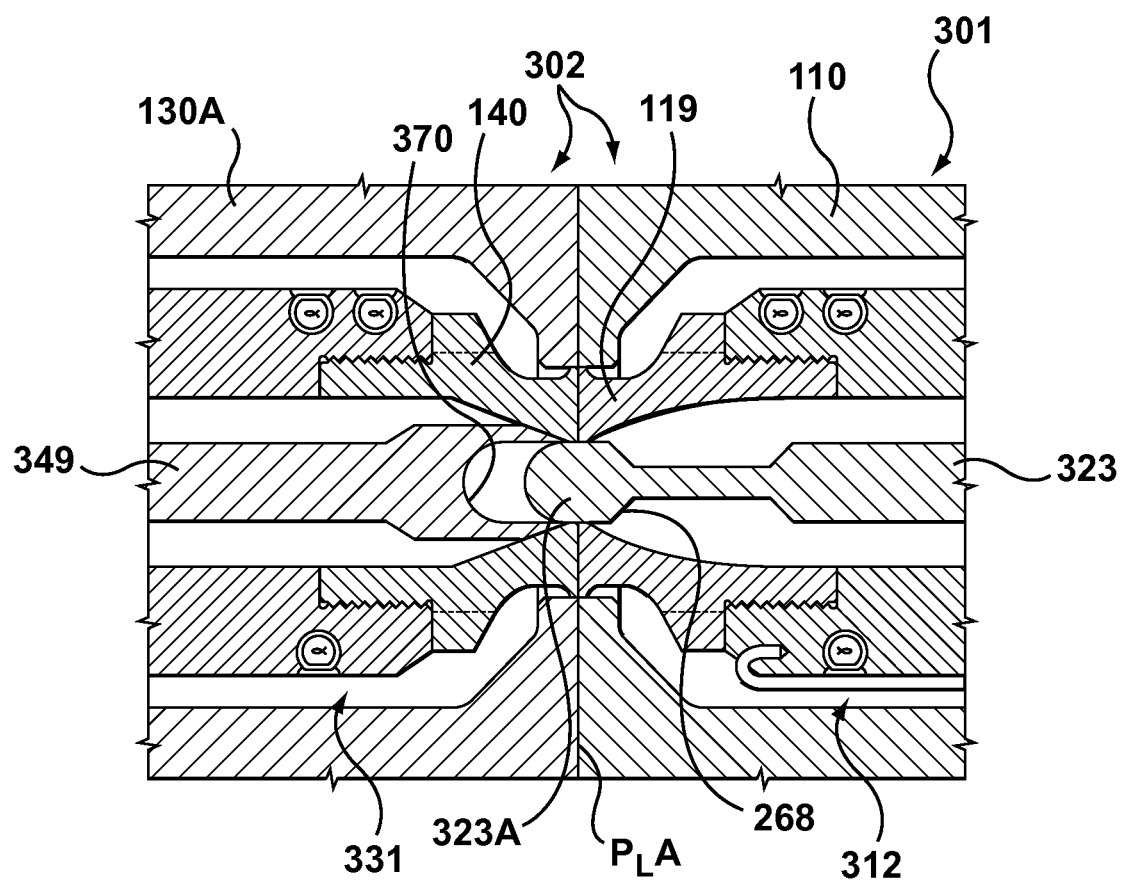

FIGS. 3A, to 3C are sectional views of transfer area A of a stack molding apparatus 301 in which a downstream end 323*a* of first valve member 323 projects beyond first transfer seal 119 towards second transfer member 131 to engage with second transfer seal 140 prior to first transfer seal 119 contacting second transfer seal 140 in accordance with another embodiment hereof. In the current embodiment, downstream end 323*a* has a rounded, convex downstream surface 369 that mates with a complementing concave bottom surface 370 of pocket 367 within upstream end 349*a* of second valve member 349 in the open-flow position. Features and aspects of other embodiments described herein may be used accordingly with the current embodiment and the same reference numbers are used for features of stack molding apparatus 301 that remain unchanged from stack molding apparatus 101 and/or other embodiments described herein, as such those features are not further described herein. FIG. 3A depicts stack molding apparatus 301 in a mold-open configuration and transfer device 302 in the closed-flow configuration, FIG. 3B depicts stack molding apparatus 301 approaching a mold-closed configuration and transfer device 302 in the closed-flow configuration, and FIG. 3C depicts stack molding apparatus 301 in a mold-closed configuration and transfer device 302 in the closed-flow configuration. In the current embodiment when first valve member 323 is in the closed-flow position, a portion of downstream end 323*a* of first valve member 323 projects beyond first transfer seal 119 towards second transfer member 331. As shown in FIG. 3B, when cavity plate 130A (of moving center section) approaches core plate 110A (of stationary side 103), downstream end 323*a* of first valve member 323 engages with second transfer member 331, or more specifically with inlet bore 140*a* of second transfer seal 140 prior to first transfer seal 119 contacting second transfer seal 140. Engagement between first valve member 323 and second transfer seal 140 prior to transfer device 302 being translated to the open-flow configuration promotes alignment between first transfer member 312 and second transfer member 331 prior to actuator 114 (not shown in FIGS. 3A-3C) translating first valve member 323 towards the open-flow position.

In a variation of the present embodiment, when first valve member 323 and second valve member 349 are in their respective closed positions first valve member 323 is configured such that at least a portion of downstream end 323*a* of first valve member 323 projects beyond first transfer seal 119 and is received within receiving pocket 367 in a sliding overlapping arrangement, prior to first transfer seal 119 contacting second transfer seal 140. Such sliding overlapping engagement between first valve member 323 and receiving pocket 367 prior to transfer device 302 being translated to the open-flow configuration ensures any misalignment between downstream end 323*a* of first valve member 323 and receiving pocket 367 is accounted for prior to actuator 114 (not shown in FIGS. 3A-3C) translating first valve member 323 towards the open-flow position. The sliding overlapping engagement of first valve member 323 and receiving pocket 367 also allows for an amount of mistiming between actuation of first valve member 323 relative to actuation of second valve member 349 when first valve member 323 and second valve member 349 are translated to their respective open-flow positions as well as when first valve member 323 and second valve member 349 are translated to their respective closed positions, while still maintaining engagement between first valve member 323 and second valve member 349.

Figure 4A:
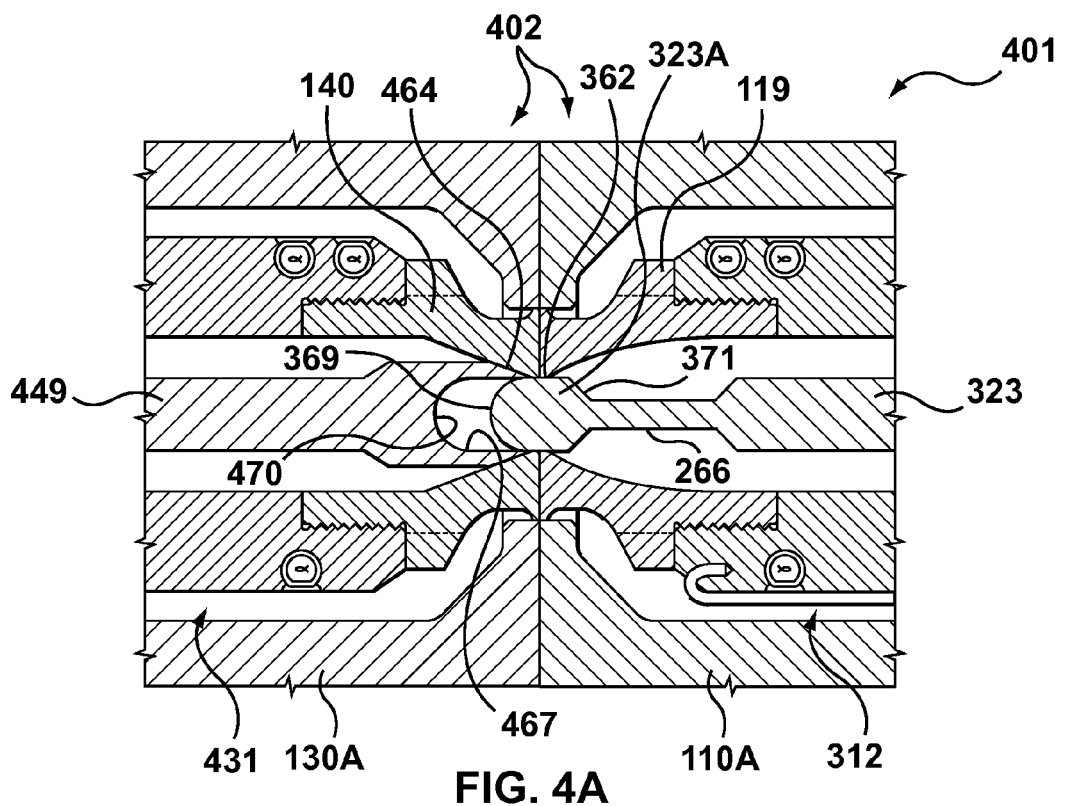
FIGS. 4A and 4B are sectional views of a transfer area A of a stack molding apparatus in which a gap is provided between the transfer device valve members when the transfer device is in the open-flow configuration in accordance with an embodiment hereof.
Figure 4B:
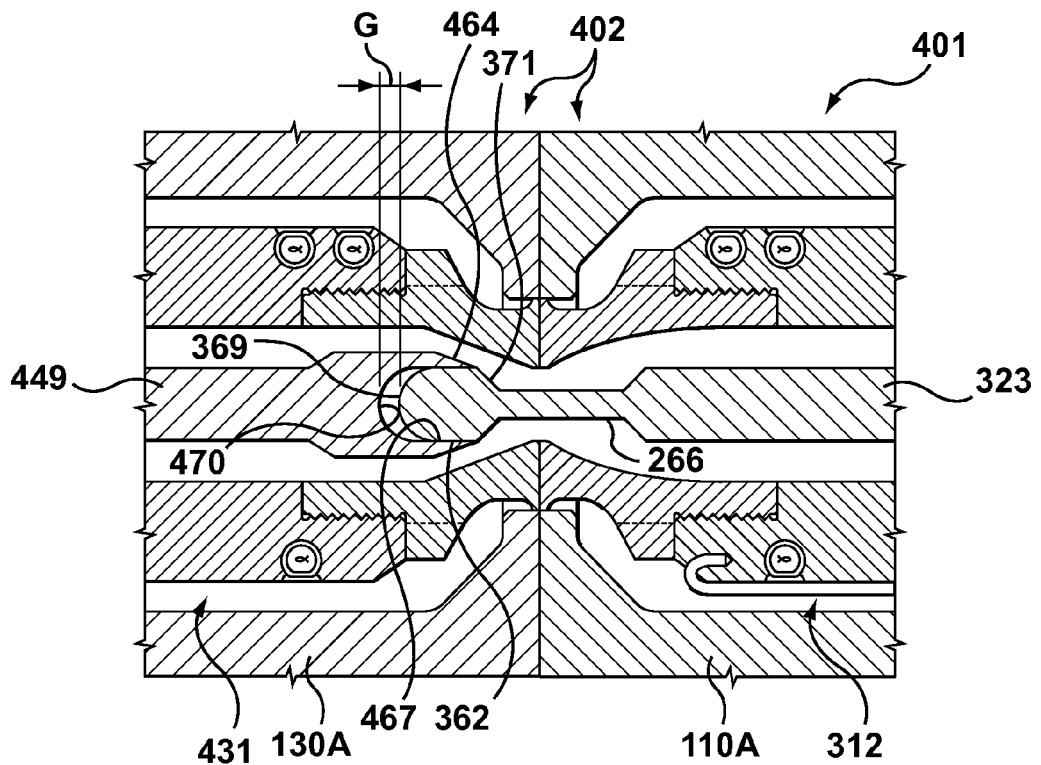

FIGS. 4A and 4B are sectional views of transfer area A of a stack molding apparatus 401 in which a gap G is provided between first and second valve members 323, 449 when transfer device 402 is in the open-flow configuration in accordance with an embodiment hereof. Features and aspects of other embodiments described herein may be used accordingly with the current embodiment and the same reference numbers are used for features of stack molding apparatus 401 that remain unchanged from stack molding apparatus 101 and/or other embodiments described herein, as such those features are not further described herein. FIG. 4A is stack molding apparatus 401 in a mold-closed configuration and transfer device 402 in the closed-flow configuration and FIG. 4B is the stack molding apparatus of FIG. 4A with transfer device 402 in the open-flow configuration.

Referring to FIG. 4B, when first valve member 323 and second valve member 449 are translated by their respective actuators 114,132 (not shown in FIGS. 4A-4B) so that transfer device 402 is in the open-flow configuration downstream end 323a of first valve member 323 is slidably received in receiving pocket 467, and there is an overlapping engagement between first valve member 323 and receiving pocket 467. To prevent molding material migrating between first valve sealing surface 362, which surrounds downstream end 323a, and receiving pocket 467, downstream end 323a and receiving pocket 467 are dimensioned to create a sliding sealing fit therebetween. In the current embodiment, gap G is provided between convex downstream surface 369 of first valve member downstream end 323a and a concave bottom surface 470 of receiving pocket 467 when first transfer member 312 and second transfer member 431 are in an engaged configuration, and transfer device 402 is in the open-flow configuration. Further, when the first transfer member 312 and second transfer member 431 are in an engaged configuration, and transfer device 402 is in the closed-flow configuration, a gap G is provided between downstream surface 369 of the first valve member 323 and bottom surface 470 of the receiving pocket 467. Gap G is provided to act as a reservoir to collect molding material that may migrate between first valve sealing surface 362 and receiving pocket 467. By providing a place for molding material to collect, gap G also ensures that a tapered transition surface 371 between downstream end 323a and flow portion 266 of first valve member 323 and second valve sealing surface 464 meet to create a seamless or constant transition between first valve member 323 and second valve member 449 in the event that molding material is present in gap G.

Figure 5:
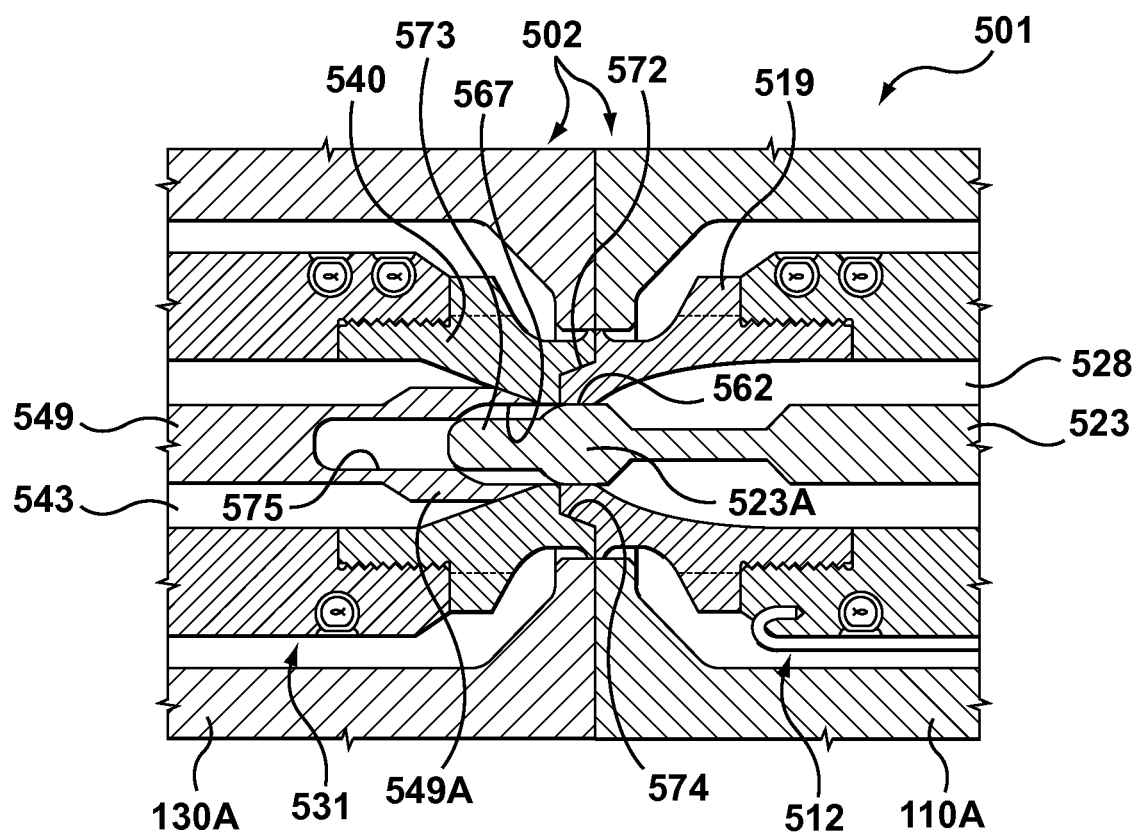
FIG. 5 is a sectional view of a transfer area A of a stack molding apparatus in which the first transfer member includes a male alignment taper and an alignment protrusion, and the second transfer member includes a female alignment taper and an alignment socket in accordance with another embodiment hereof.

FIG. 5 is a sectional view of melt transfer area A of a stack molding apparatus 501 in which first transfer member 512 includes a male alignment taper 572 and an alignment protrusion 573, and second transfer member 531 includes a female alignment taper 574 and an alignment socket 575 in accordance with another embodiment hereof. Features and aspects of other embodiments described herein may be used accordingly with the current embodiment and the same reference numbers are used for features of stack molding apparatus 501 that remain unchanged from stack molding apparatus 101 described above and/or other embodiments described herein, as such those features are not further described herein. In the current embodiment, male alignment taper 572 is provided on first transfer seal 519 and alignment protrusion 573 is a portion of downstream end 523a of first valve member 523, and female alignment taper 574 is provided on second transfer seal 540 and alignment socket 575 is formed within second valve member 549 to extend downstream from receiving pocket 567 of upstream end 549a thereof. In an alternate embodiment (not shown), male alignment taper 572 is provided on second transfer seal 540 and alignment protrusion 573 is provided on second valve member 549, and female alignment taper 574 is provided on first transfer seal 519 and alignment socket 575 is provided in first valve member 523. Male and female alignment tapers 572, 573, and alignment protrusion 573 and alignment socket 575 can be considered wear surfaces that accommodate for misalignment, as discussed above, in order to promote longer operational life of first valve sealing surface 562 and receiving pocket 567.

Upon translation of stack molding apparatus 501 from the mold-open configuration to the mold-closed configuration male alignment taper 572 engages with female alignment taper 574. Engagement between male alignment taper 572 and corresponding female alignment taper 574 promotes alignment between first transfer member 512 and second transfer member 531, which subsequently promotes alignment between first transfer channel 528 and second transfer channel 543, thus promoting alignment at the interface of first transfer channel 528 and second transfer channel 543. Further when first valve member 523 is translated to the open-flow position, alignment protrusion 573 is received within correspondingly-shaped alignment socket 575 prior to first valve sealing surface 562 being slidably received in receiving pocket 567. Engagement between alignment protrusion 573 and alignment socket 575 prior to first valve sealing surface 562 being slidably received in receiving pocket 567 promotes alignment between first valve sealing surface 562 and receiving pocket 567 when actuator 114 (not shown in FIG. 5) translates first valve member 523 towards the open-flow position.

In an embodiment (not shown) to promote alignment between first and second transfer members 512, 531, transfer device 502 includes male and female alignment tapers 572, 574 and without also including alignment protrusion 573 and alignment socket 575. In another embodiment (also not shown) to promote alignment between first and second transfer members 512, 531, melt transfer device 502 includes alignment protrusion 573 and alignment socket 575 without also including male and female alignment tapers 572, 574.

In an embodiment (not shown) alignment protrusion 573 and receiving pocket 567 are dimensioned such that as stack molding apparatus 501 is translated from the mold-open configuration to the mold-closed configuration alignment protrusion 573 engages with alignment socket 575 prior to first transfer seal 519 engaging with or contacting second transfer seal 540.

Figure 6A:
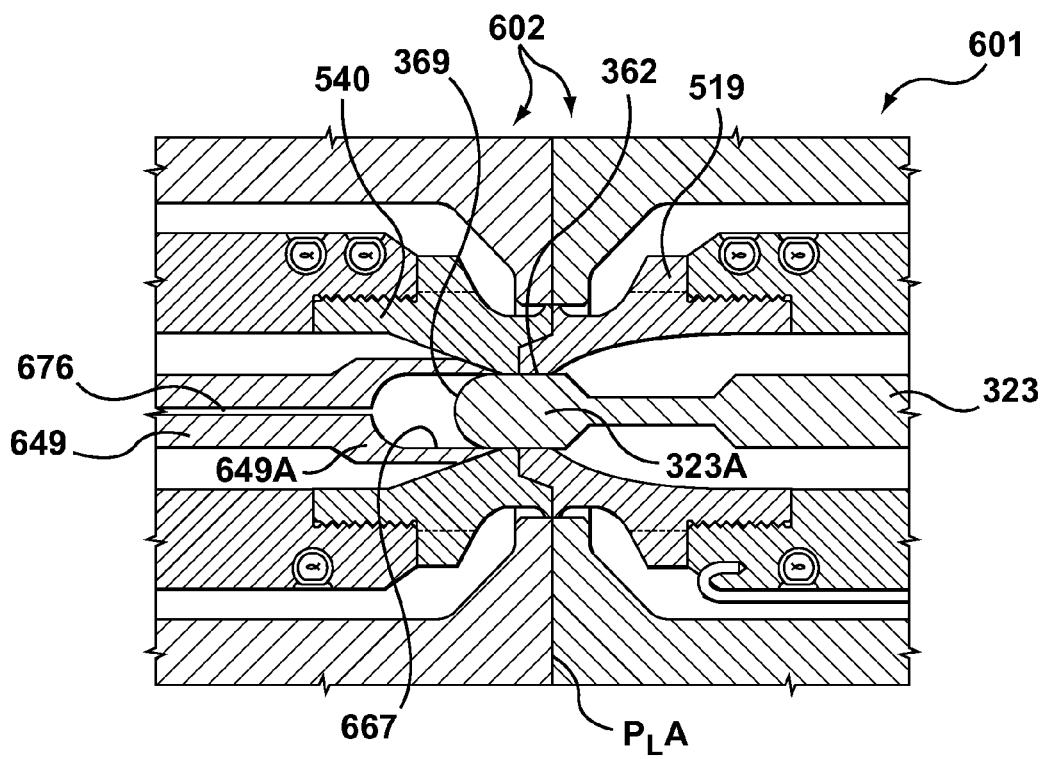
FIGS. 6A and 6B are sectional views of a transfer area A of a stack molding apparatus having a second valve member in which the second valve member is provided with a vent channel in accordance with another embodiment hereof.
Figure 6B:
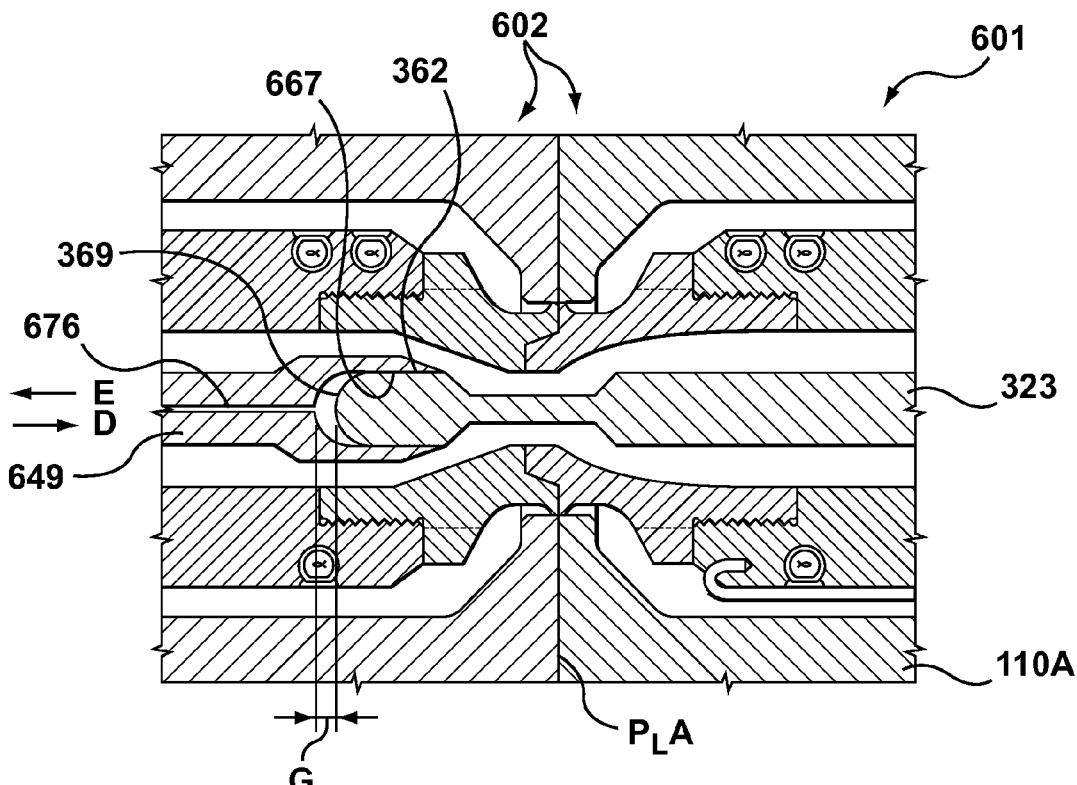

FIGS. 6A and 6B are sectional views of melt transfer area A of a stack molding apparatus 601 having a transfer device 602 in which second valve member 649 is provided with a vent channel 676 in accordance with another embodiment hereof. Features and aspects of other embodiments described herein may be used accordingly with the current embodiment and the same reference numbers are used for features of stack molding apparatus 601 that remain unchanged from stack molding apparatus 101 and/or other embodiments described herein, as such those features are not further described herein. FIG. 6A is stack molding apparatus 601 in the mold-closed configuration and transfer device 602 in a closed-flow configuration and FIG. B is the stack molding apparatus 601 of FIG. 6A in which transfer device 602 is in the open-flow configuration.

Downstream end 323a of first valve member 323 and receiving pocket 667 within upstream end 649a of second valve member 649 are dimensioned to permit slidable overlapping engagement therebetween. When transfer device 602 is translated from the closed-flow configuration, as shown in FIG. 6A to the open-flow configuration, as shown in FIG. 6B, first valve member 323, or more specifically, first valve sealing surface 362 that surrounds downstream end 323a is slidably received in receiving pocket 667. Conversely, when transfer device 602 is translated from the open-flow configuration to the closed-flow configuration, first valve sealing surface 362 is slidably withdrawn from receiving pocket 667.

When transfer device 602 is translated between open and closed-flow configurations, air may become trapped, or a vacuum may be created, between receiving pocket 667 and downstream surface 369 of first valve member downstream end 323a, which may adversely affect the operational efficiency of actuators 114, 132 (not shown in FIGS. 6A-6B). To prevent this situation from occurring, at least one of first valve member 323 and second valve member 649 includes vent channel 676 extending between receiving pocket 667 and atmosphere to establish fluid communication therebetween. In the current embodiment, vent channel 676 is formed to extend through second valve member 649. When transfer device 602 is translated from the closed-flow configuration, as shown in FIG. 6A, to the open-flow configuration, as shown in FIG. 6B, vent channel 676 provides a passageway through which air in gap G may be expelled, as shown by arrow ←E. Conversely, when transfer device 602 is translated from the closed-flow configuration to the open-flow configuration, vent channel 676 provides a passageway though which air may be drawn into gap G, as shown by arrow →D.

Figure 7A:
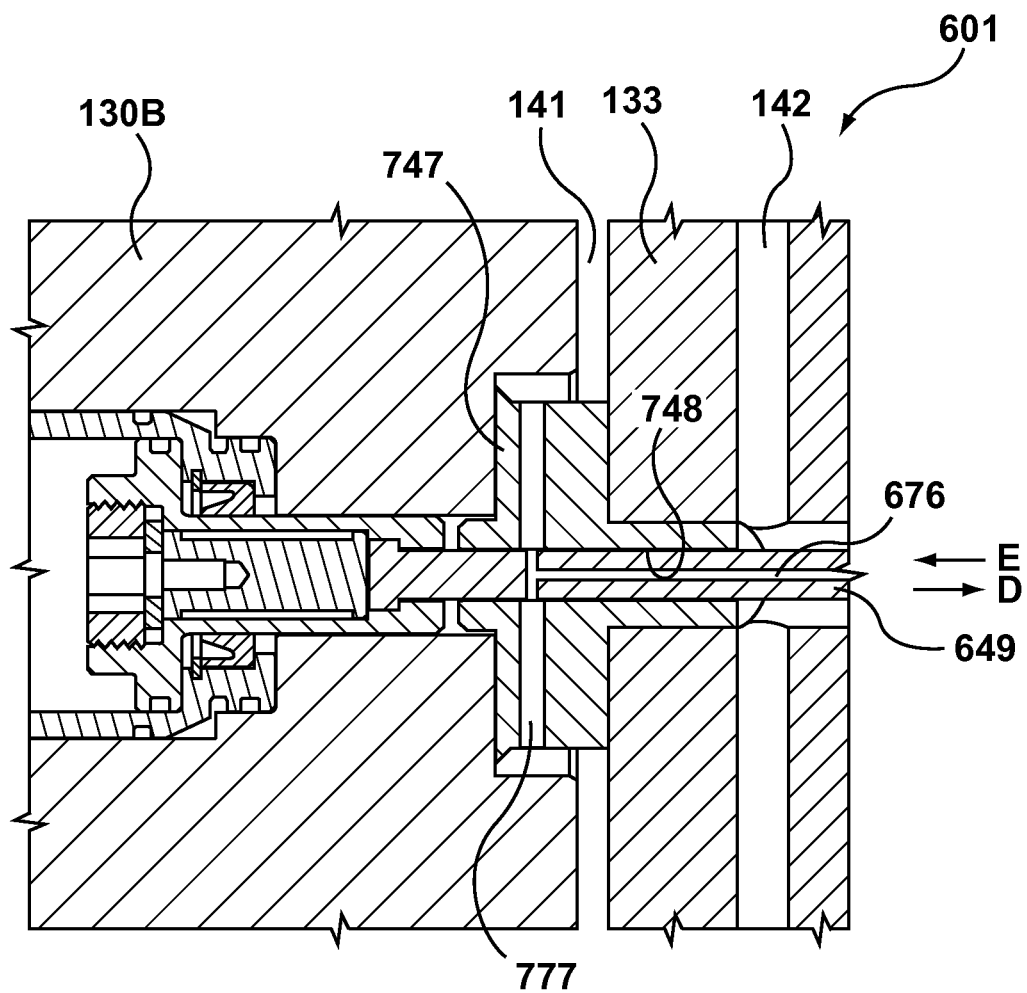
FIG. 7A, is a sectional view of a portion of the stack molding apparatus of FIGS. 6A and 6B in which the vent channel is in fluid communication with atmosphere via the manifold insulating space.

FIG. 7A, is a sectional view of a portion of stack molding apparatus 601 of FIGS. 6A and 6B in which vent channel 676 is in fluid communication with atmosphere via manifold pocket 141. In order to establish fluid communication between receiving pocket 667 (not shown in FIG. 7A) and manifold pocket 141 a secondary vent channel 777 that is in fluid communication with vent channel 676 is provided in valve bushing 747 that extends between guide bore 748 and manifold pocket 141. When transfer device 602 is translated from the closed-flow configuration, as shown in FIG. 6A, to the open-flow configuration, as shown in FIG. 6B, vent channel 676 together with secondary vent channel 777 provide a passageway through which air in gap G may be expelled, as shown by arrow ←E. Conversely, when transfer device 602 is translated from the open-flow configuration to the closed-flow configuration vent channel 676 and secondary vent channel 777 provide a passageway though which air gap G may be drawn, as shown by arrow →D. In the current embodiment, secondary vent channel 777 is sized relative to vent channel 676 in order to maintain fluid communication between vent channel 676 and vent channel 777 when second valve member 649 is in both the closed-flow position and the open-flow position.

Figure 7B:
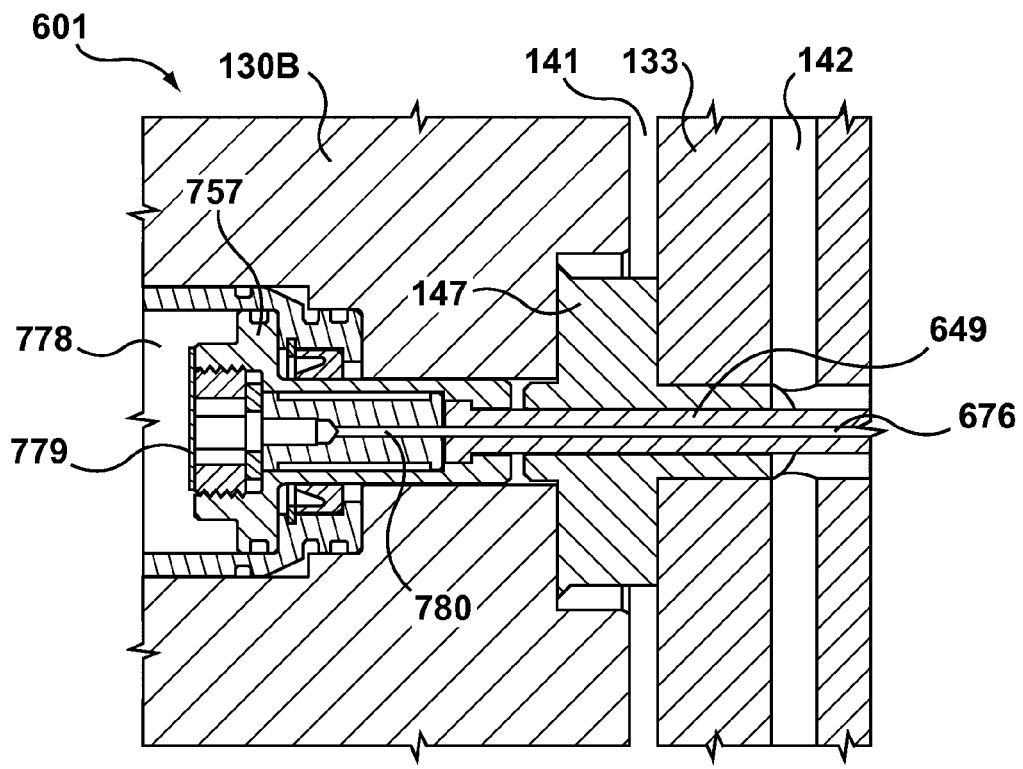
FIGS. 7B and 7C are sectional views of a portion of the stack molding apparatus of FIGS. 6A and 6B in which the vent channel is in fluid communication with atmosphere via the piston chamber and a check valve is located therebetween.
Figure 7C:
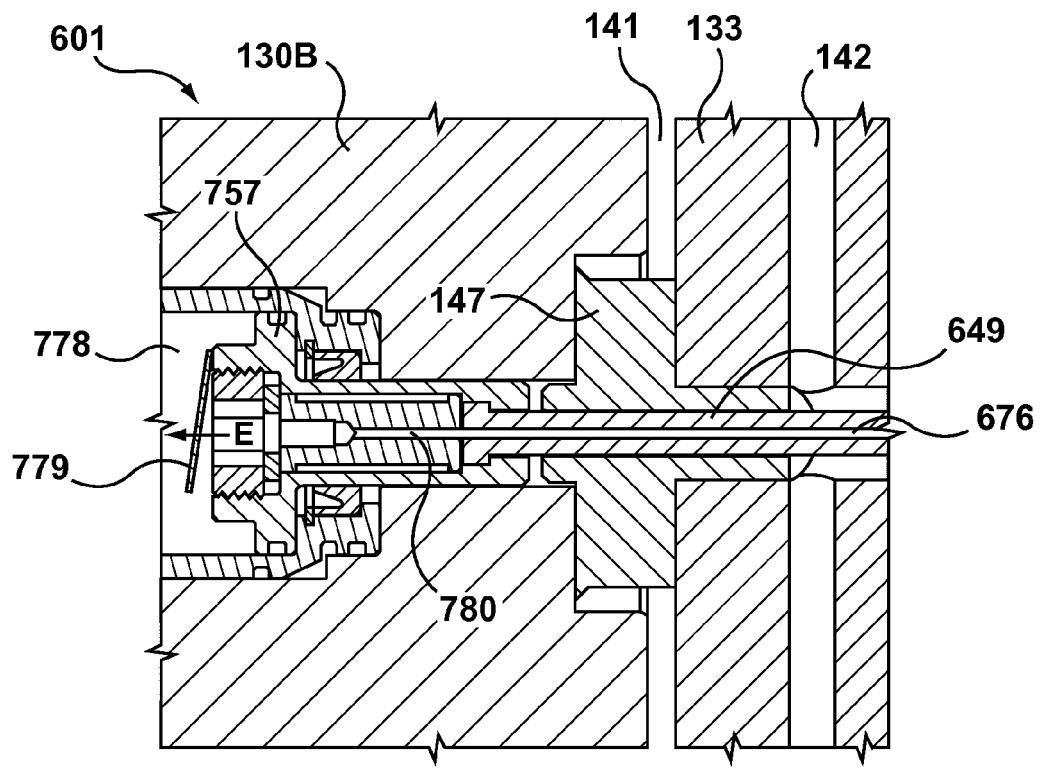

FIGS. 7B and 7C are sectional views of a portion of stack injection apparatus 601 of FIGS. 6A and 6B in which vent channel 676 is in fluid communication with atmosphere via a piston chamber 778 and a check valve 779 is located therebetween. In FIG. 7B check valve 779 is a closed position whereas in FIG. 7C check valve 779 is in an open position. In order to establish fluid communication between receiving pocket 667 and piston chamber 778 a secondary vent channel 780 is provided in piston 757 that is in fluid communication between vent channel 676 and piston chamber 778. Check valve 779 prevents fluid communication between receiving pocket 667 and piston chamber 778 when pressurized fluid is introduced to piston chamber 778 to translate second valve member 649 from the open-flow position to the closed-flow position yet permits fluid communication between receiving pocket 667 and piston chamber 778 in the direction from receiving pocket 667 to piston chamber 778. When transfer device 602 is translated from the closed-flow configuration as shown in FIG. 6A to the open-flow configuration as shown in FIG. 6B, vent channel 676 together with secondary vent channel 780 provide a passageway through which air in gap G may be expelled as shown by arrow ←E.

In the current embodiment check valve 779 is depicted as a flap valve by way of example and not limitation. In an embodiment (not shown) check valve 779 is a ball check valve or other style check valve. In the current embodiment check valve 779 is located in piston 757 by way of example and not limitation. In another embodiment check valve 779 may be located between piston chamber 778 and receiving pocket 667 anywhere along vent channel 676 or secondary vent channel 780.

Figure 8A:
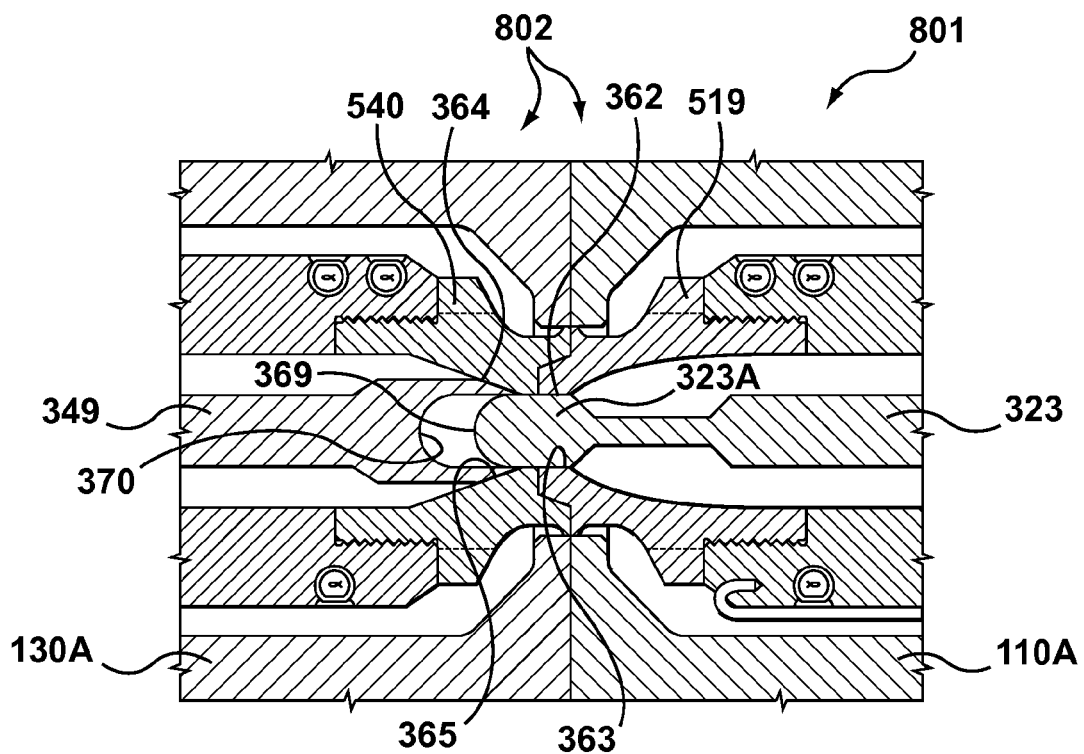
FIGS. 8A-8C are sectional views of a transfer area A of a stack molding apparatus in which the second valve member is biased to the closed-flow position and is pushed to the open-flow position by actuation of the first valve member in accordance with an embodiment hereof.
Figure 8B:
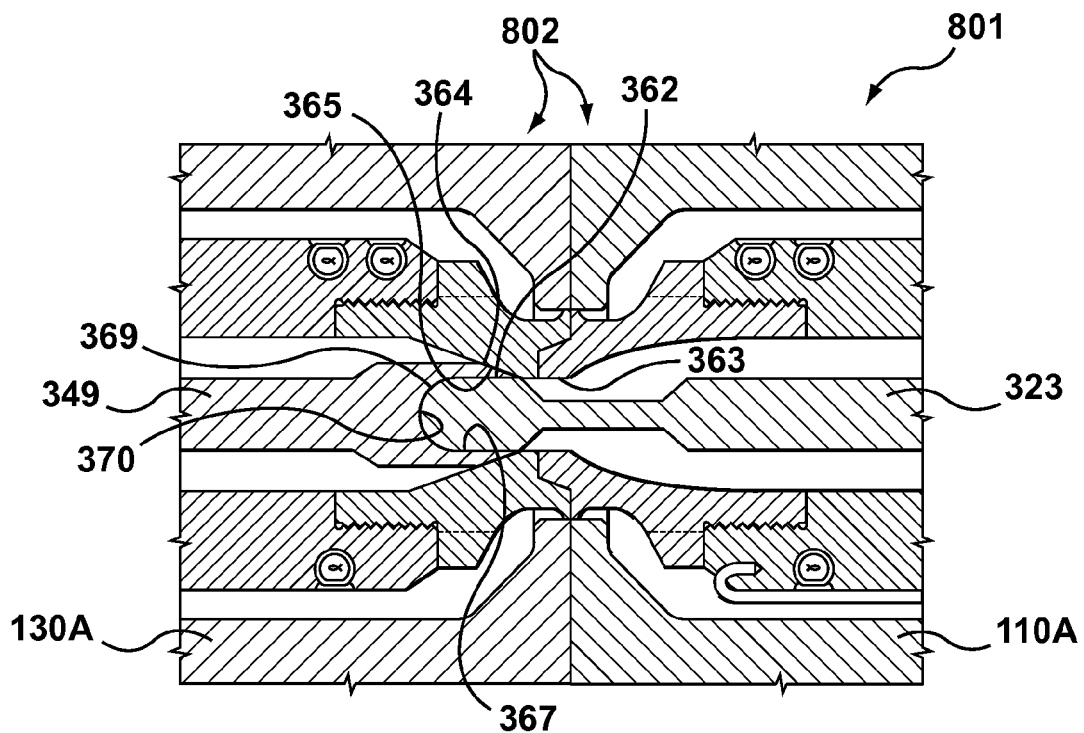
Figure 8C:
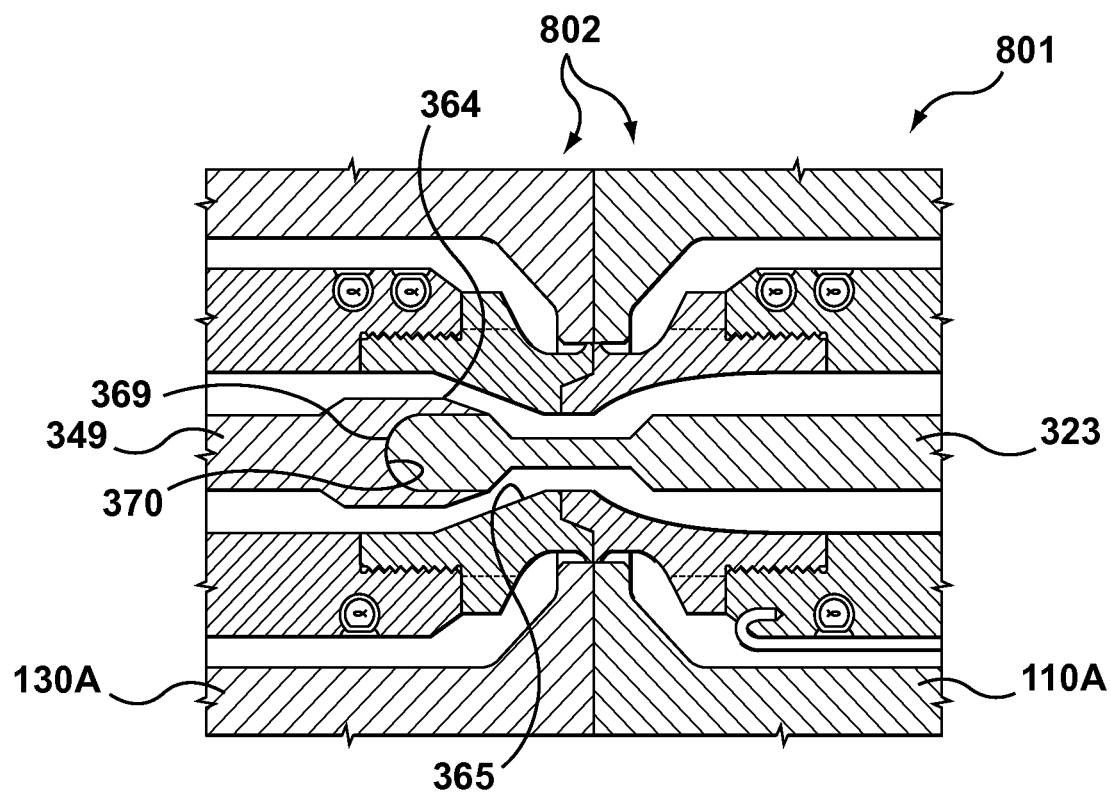
Figure 9A:
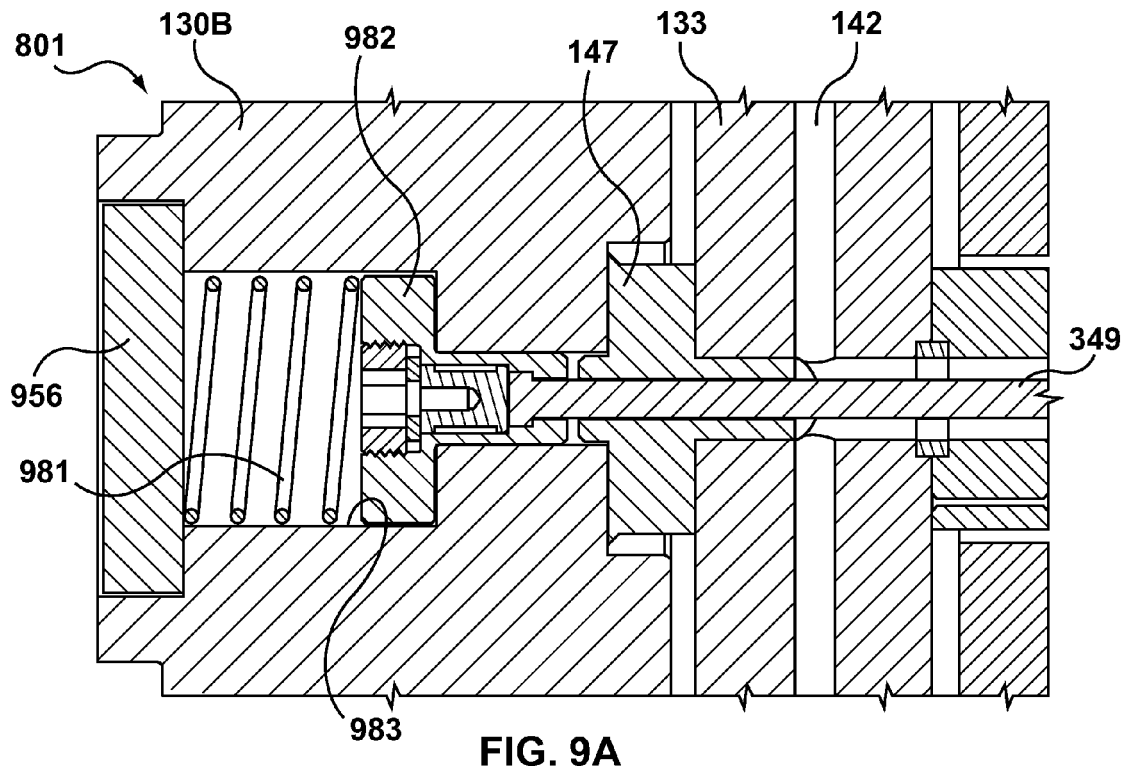
FIGS. 9A and 9B are sectional views of a portion of the stack molding apparatus of FIGS. 8A-8C showing a biasing member that is associated with the second valve member biasing member.
Figure 9B:
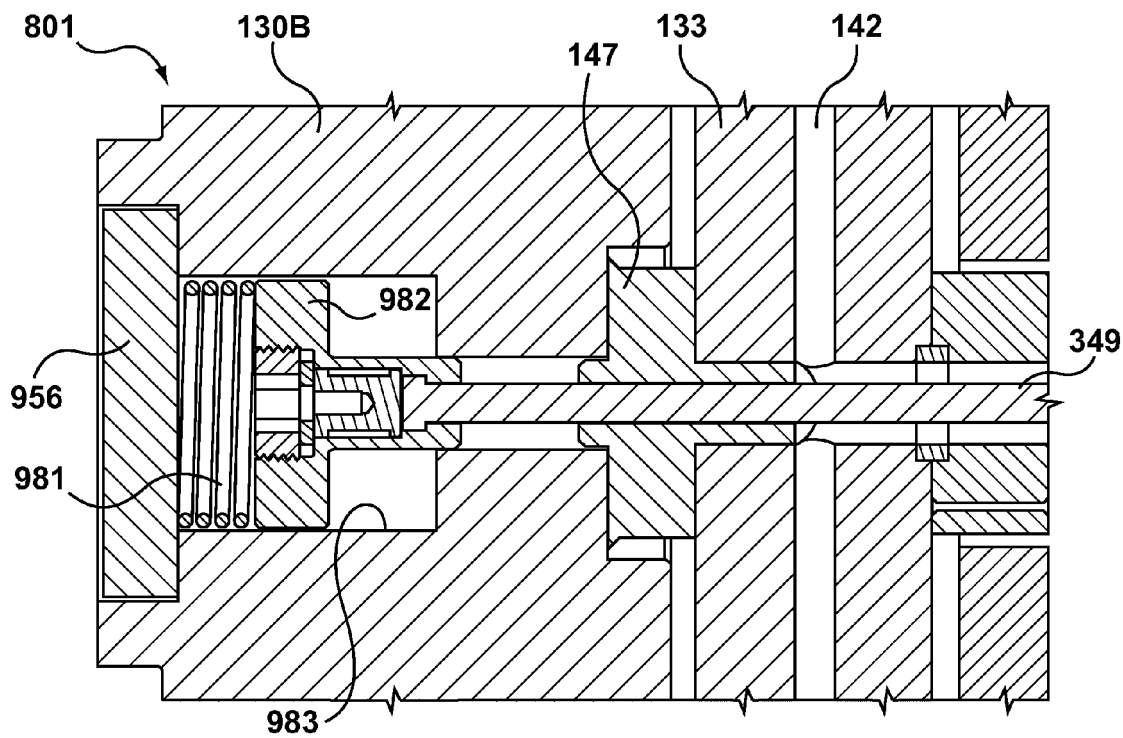

FIGS. 8A to 8C are sectional views of melt transfer area A of a stack molding apparatus 801 in which transfer device 802 includes a biasing member that biases second valve member 349 to the closed-flow position and is pushed to the open-flow position by actuation of first valve member 323 in accordance with another embodiment hereof. Features and aspects of other embodiments described herein may be used accordingly with the current embodiment and the same reference numbers are used for features of stack molding apparatus 801 that remain unchanged from stack molding apparatus 101 and/or other embodiments described herein, as such those features are not further described herein. FIGS. 9A and 9B are enlarged sectional views of a portion of stack molding apparatus 801 of FIGS. 8A-8C showing biasing member 981 that is associated with second valve member 349. In FIG. 9A second valve member 349 is biased to the closed-flow position as depicted in FIGS. 8A and 8B and in FIG. 9B second valve member 349 has been pushed to the open-flow position by actuation of first valve member 323 as depicted in FIG. 8C.

Referring to FIGS. 8A and 9A stack molding apparatus 801 is in the mold-closed configuration and transfer device 802 is in the closed-flow configuration such that first valve sealing surface 362 engages first valve seat 363 and biasing member 981 biases second valve member such that second valve sealing surface 364 engages second valve seat 365. A piston 982 is slidably disposed in a stepped bore 983 in cavity plate 130B and is coupled to second valve member 349. Biasing member 981 is positioned between piston 982 and cover 956 to bias piston 982 towards a shoulder defined by stepped bore 983, and subsequently to bias second valve member 349, coupled to piston 982, to the closed-flow position.

Referring now to FIGS. 8B, 8C, and to FIG. 9B, actuator 114 (not shown in FIG. 8B) has begun translating first valve member 323 towards the open-flow position, first valve sealing surface 362 has been displaced from first valve seat 363, and first valve member 323 has been slidably received in receiving pocket 367 such that convex downstream surface 369 of downstream end 323a of the first valve member engages with complementing concave bottom surface 370 of receiving pocket 367. As actuator 114 continues actuating first valve member 323 further towards the open-flow position, first valve member 323 pushes second valve member 349 to disengage second valve sealing surface 364 from the second valve seat 365 such that transfer device 802 is in the open-flow configuration as depicted in FIG. 8C. When transfer device 802 is translated to the open-flow configuration biasing member 981 is compressed as depicted in FIG. 9B.

As transfer device 802 is translated from the open-flow configuration to the closed-flow configuration, contact between downstream surface 369 of first valve member 323 and bottom surface 470 of receiving pocket 367 is maintained until second valve sealing surface 364 engages second valve seat 365 at which time second valve member 349 is in the closed-flow position and first valve member 323 is slidably withdrawn from receiving pocket 367.

In the current embodiment, biasing member 981 is depicted as a mechanical biasing member such as a coil spring by way of example and not limitation. In another embodiment (not shown) biasing member 981 is another type of mechanical biasing member such as a plurality of Belleville washers, or is a fluid spring.

In a variation of the current embodiment, first and second valve members 323, 349 are similar to those depicted in FIG. 5 in which one of first valve member 323 and second valve member 349 includes an alignment protrusion 573 and the other of first valve member 323 and second valve member 349 includes an alignment socket 575, and an end of alignment protrusion 573 pushes on the bottom of alignment socket 575 to disengage the second valve sealing surface from the second valve seat.

Figure 10A:
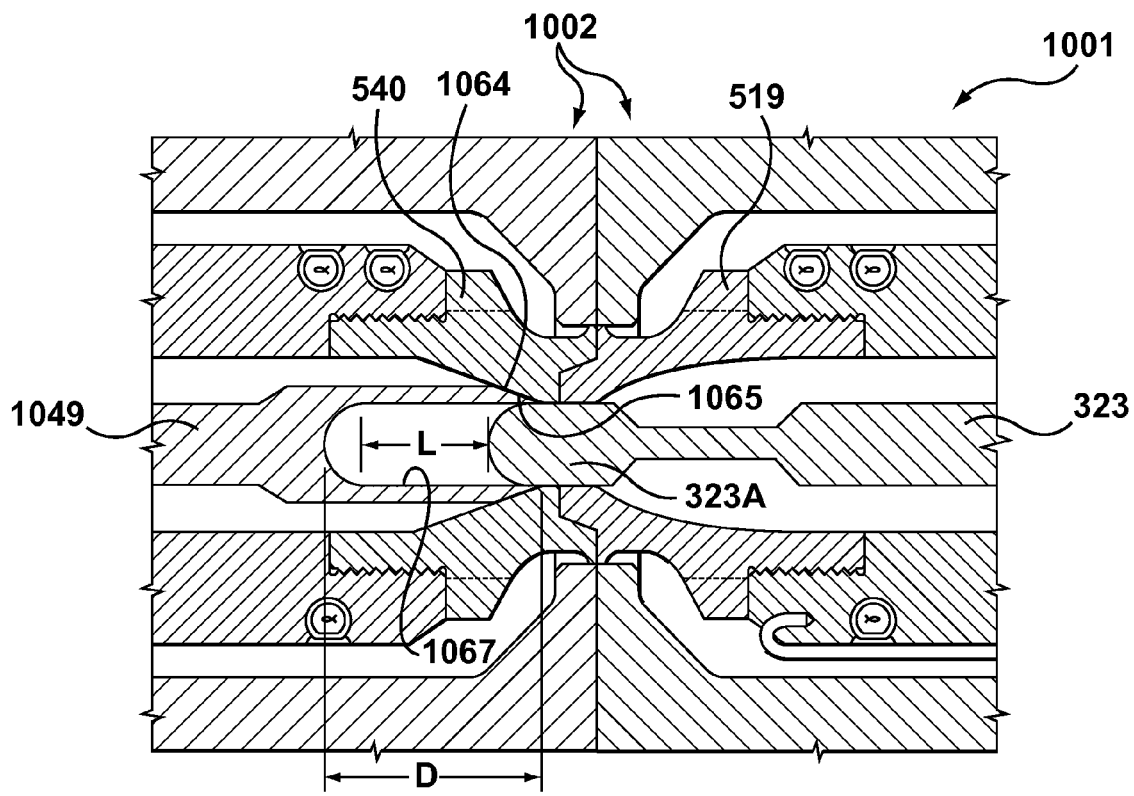
FIGS. 10A and 10B are sectional views of a transfer area A of a stack molding apparatus in which the depth of the receiving pocket is greater than the actuation stroke length of the first valve member 123 in accordance with an embodiment hereof.
Figure 10B:
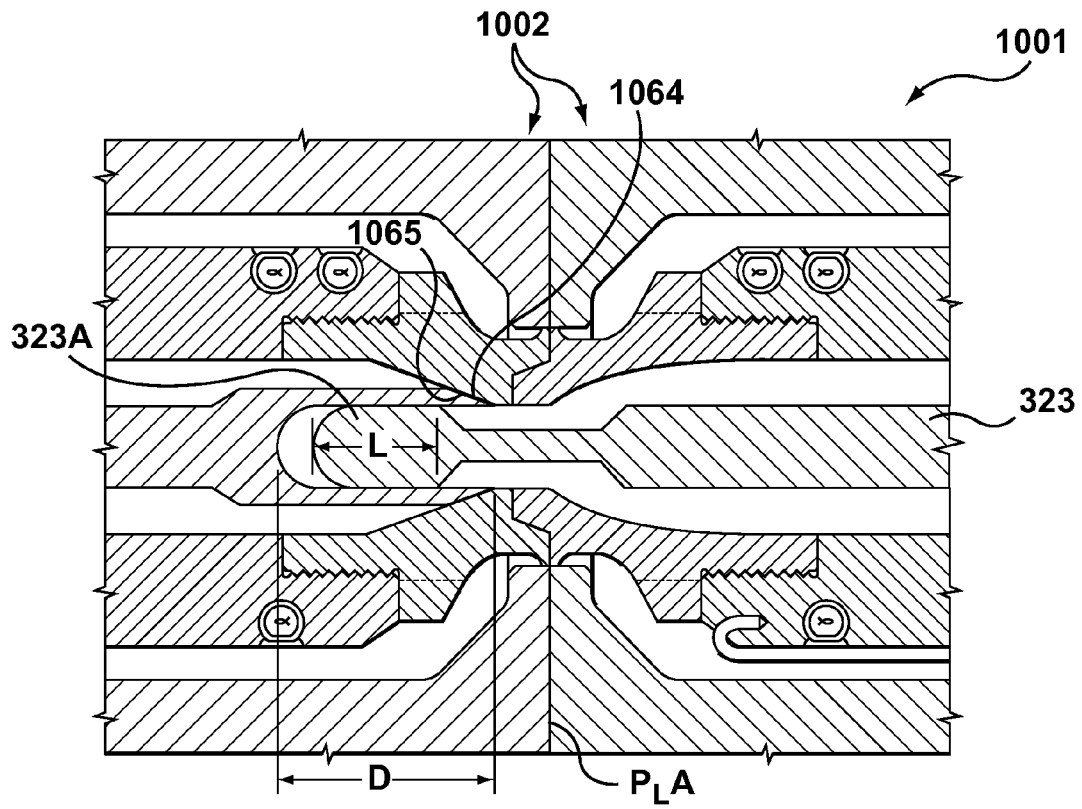

FIGS. 10A and 10B are sectional views of melt transfer area A of a stack molding apparatus 1001 in which the depth D of receiving pocket 1067 is greater than the actuation stroke length L of first valve member 323 in accordance with an embodiment hereof. Features and aspects of other embodiments described herein may be used accordingly with the current embodiment and the same reference numbers are used for features of stack molding apparatus 1001 that remain unchanged from stack molding apparatus 101 and/or other embodiments described herein, as such those features are not further described herein. FIG. 10A depicts stack molding apparatus 1001 in the mold-closed configuration and transfer device 1002 in the closed-flow configuration, and FIG. 10B depicts transfer device 1002 with first valve member 323 in the open-flow position and second valve member 1049 in the closed-flow position. In the current embodiment, the depth D of receiving pocket 1067 is sized to slidably receive the entire length of first valve member downstream end 323a when first valve member 323 is translated to the open-flow position and second valve member 1049 remains in the closed-flow position and second valve sealing surface 1064 remains engaged with the second valve seat 1065. With the depth D of sealing pocket 1067 being greater than the actuation stroke length L of first valve member 323, when translating melt transfer device 1002 from the closed-flow configuration to the open-flow configuration, first valve member 323 can be actuated entirely to its open flow position prior to actuating second valve member 1049 to its open flow position. Conversely, when translating melt transfer device 1002 from the open flow configuration to the closed-flow configuration, second valve member 1049 can be actuated entirely to its closed-flow position prior to actuating first valve member 323 to its closed-flow position.

Figure 11A:
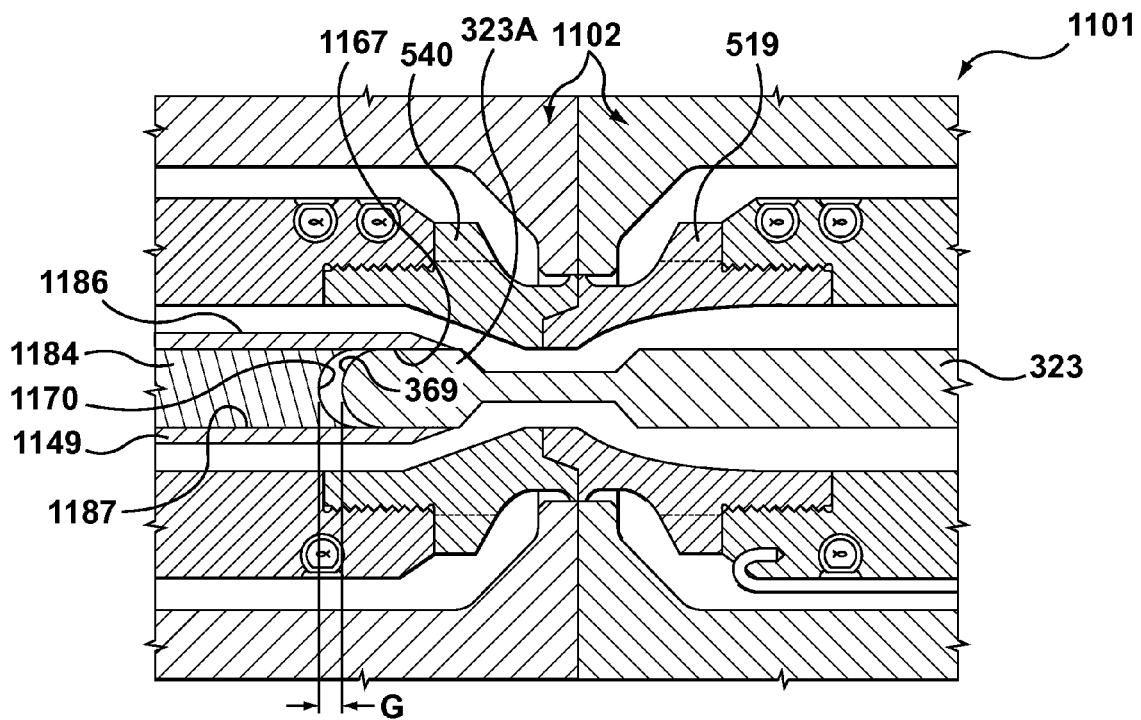
FIGS. 11A to 11D are sectional views of a transfer area A of a stack molding apparatus in which the second valve member includes a pin for removing molding material that may migrate between the first valve member and the receiving pocket in accordance with an embodiment hereof.
Figure 11B:
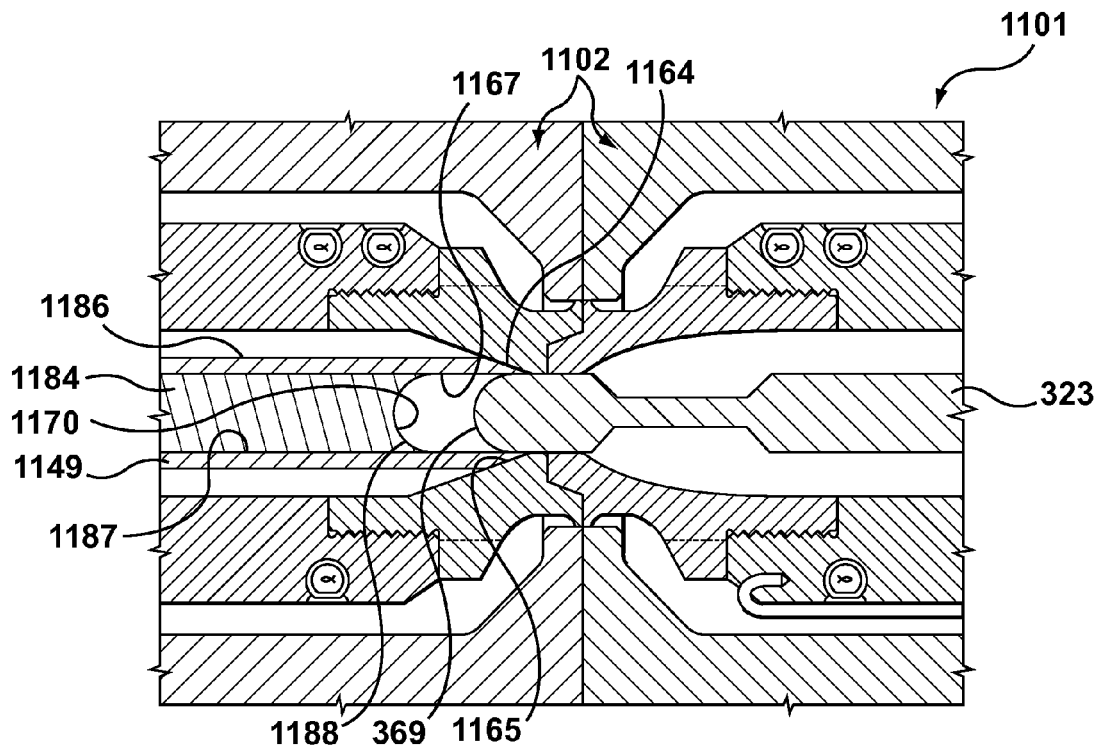
Figure 11C:
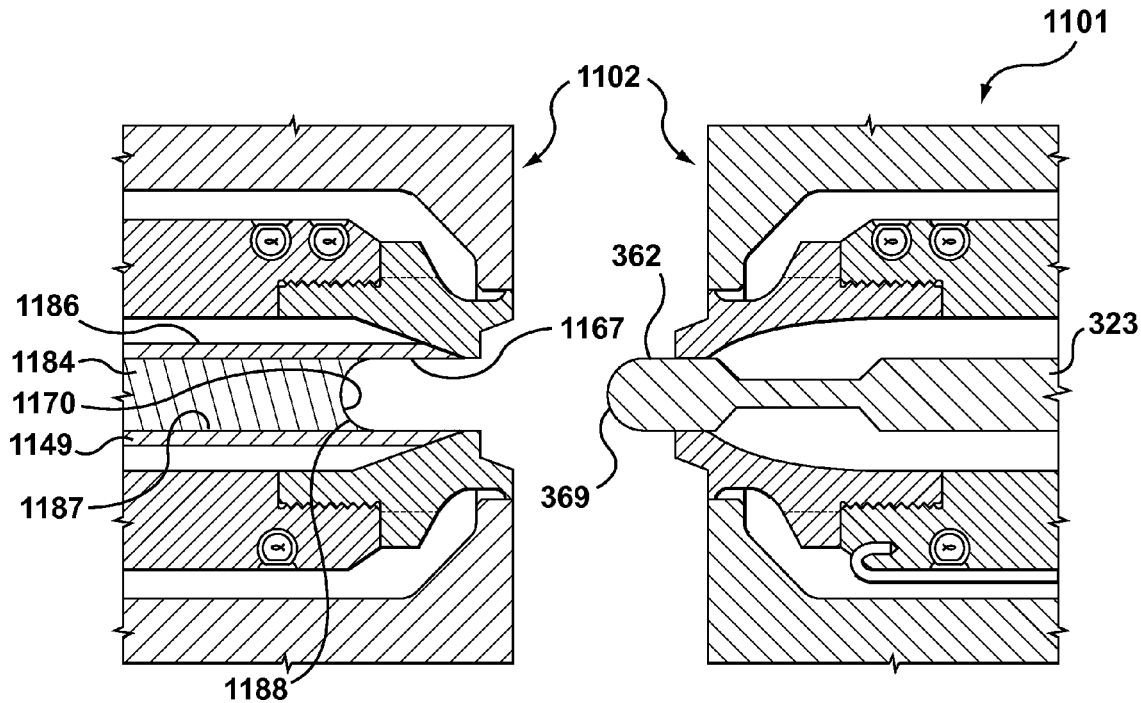
Figure 11D:
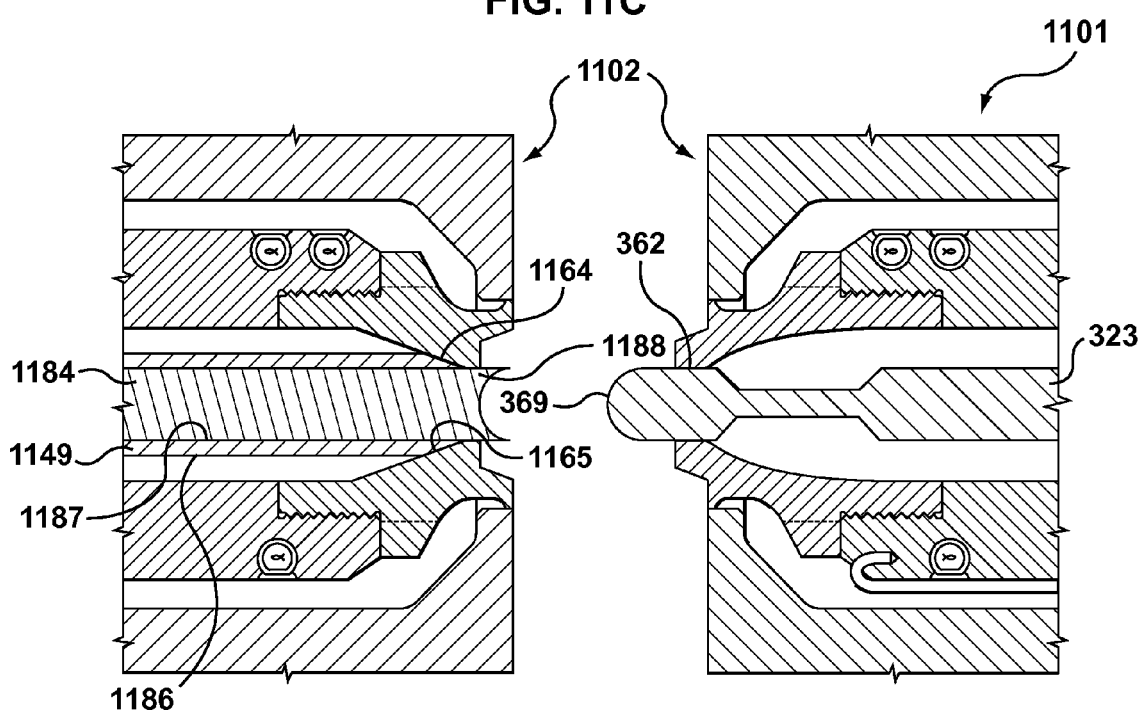
Figure 12:
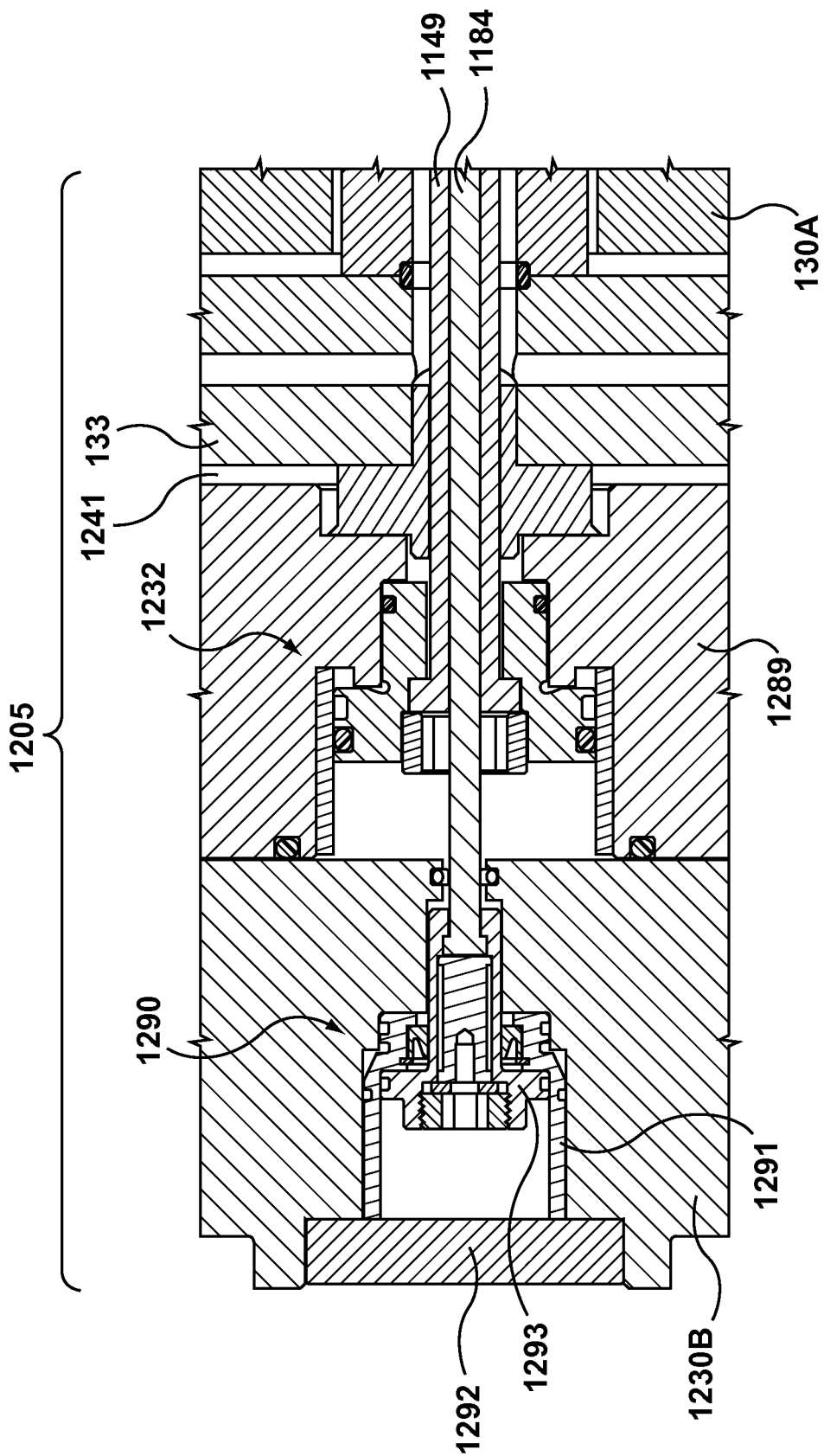
FIG. 12 is a sectional view of a portion of the stack molding apparatus of FIGS. 11-11D showing the second valve member and pin actuators.

FIGS. 11A to 11D are sectional views of melt transfer area A of a stack molding apparatus 1101 in which second valve member 1149 includes a pin 1184 for removing molding material that may migrate between first valve member 323 and receiving pocket 1167 in accordance with an embodiment hereof. Features and aspects of other embodiments described herein may be used accordingly with the current embodiment and the same reference numbers are used for features of stack molding apparatus 1101 that remain unchanged from stack molding apparatus 101 and/or other embodiments described herein, as such those features are not further described herein. FIG. 12 is a sectional view of a portion of stack molding apparatus 1101 of FIGS. 11-11D showing the second valve member 1149, pin 1184 and actuators 1232, 1290. FIG. 11A depicts stack molding apparatus 1101 in the mold-closed configuration, transfer device 1102 in the open-flow configuration, and pin 1184 in a retracted position. FIG. 11B depicts transfer device 1102 of FIG. 11A in the closed-flow configuration, FIG. 11C depicts stack molding apparatus 1101 of FIG. 11B in the mold-open configuration, and FIG. 11D depicts stack molding apparatus 1101 of FIG. 11C in which pin 1184 is in an extended position. In the current embodiment second valve member 1149 is provided in the form of a sleeve having an outer surface 1186 over which molding material is able to flow when transfer device 1102 is in the open-flow configuration, and having an inner surface 1187 defining a pathway along which pin 1184 is slidably disposed. Receiving pocket 1167 is defined by inner surface 1187 and pin 1184. Inner surface 1187 defines a portion of receiving pocket 1167 in which first valve member 323 is slidably received when first valve member 323 is translated to the open-flow position, and bottom surface 1170 of receiving pocket 1167 is defined in an end 1188 of pin 1184. Similar to the embodiment described above having regard to FIGS. 4A and 4B when stack molding apparatus 1101 is in an open-flow configuration, a gap G is provided between downstream surface 369 of first valve member downstream end 323a and bottom surface 1170 of receiving pocket 1167, as shown in FIG. 11A, to act as a reservoir in which molding material that may migrate between first valve member 323 and receiving pocket 1167 is able to collect. In order to remove such material from receiving pocket 1167, pin 1184 can be translated to an extended position as shown in FIG. 11D to displace the collected material.

Referring now to FIG. 12 as well as to FIGS. 11A-11D, moving center section 1205 includes a cavity plate 130A, a cavity plate 1230B, and an actuator plate 1289 with manifold 133 located in a manifold pocket 1241 defined between actuator plate 1289 and cavity plate 130A. Second valve member 1149 is coupled to actuator 1232 located in actuator plate 1289. In FIG. 12, actuator 1232 and second valve member 1149 are depicted in the closed-flow position such that second valve sealing surface 1164 is engaged with second valve seat 1165 as depicted in FIGS. 11B-11D. Pin 1184 extends through second valve member 1149 and is coupled to piston 1293, of actuator 1290 in cavity plate 1230B. Actuator 1290 includes a housing 1291, a cover 1292, and piston 1293 slidably disposed within housing 1291 and coupled to pin 1184. Actuator 1290 and pin 1184 are actuatable between a retracted position, as shown in FIGS. 11A-11C, and an extended position, as shown in FIG. 11D. In FIG. 12 actuator 1290 and pin 1184 are shown in the extended position such that pin 1184 is extended relative to second valve member 1149. In the event that molding material migrates between first valve sealing surface 362 and receiving pocket 1167, pin 1184 can be translated to the extended position to remove the molding material from receiving pocket 1167. Actuation of pin 1184 can occur during each injection molding cycle when stack molding apparatus 1101 is translated to the mold-open configuration or at any other interval as deemed necessary having regard to the frequency and volume at which molding material may collect in gap G.

Figure 13:
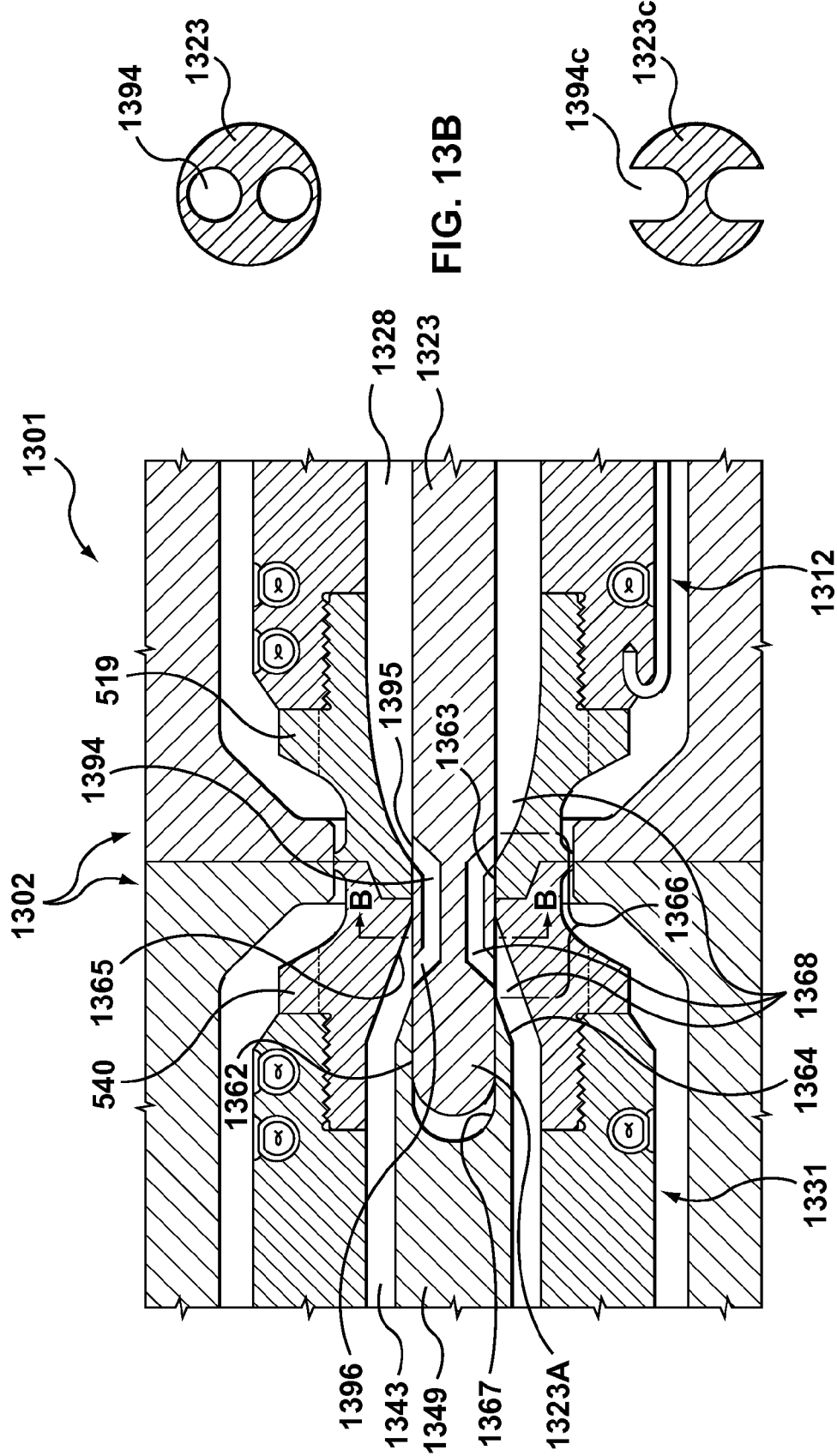
FIG. 13A is a sectional view of a transfer area A of a stack molding apparatus in which the transfer device has a first valve member with a tunnel flow portion in accordance with an embodiment hereof.
FIG. 13B is a sectional view of FIG. 13A taken along line B-B.
FIG. 13C is a sectional view of a first valve member having a grooved flow portion in accordance with an embodiment hereof.

FIG. 13A is a sectional view of melt transfer area A of a stack molding apparatus 1301 in which transfer device 1302 has a first valve member 1323 having a flow portion 1366 in the form of a plurality of tunnel segments 1394 in accordance with an embodiment hereof. Features and aspects of other embodiments described herein may be used accordingly with the current embodiment and the same reference numbers are used for features of stack molding apparatus 1301 that remain unchanged from stack molding apparatus 101 and/or other embodiments described herein, as such those features are not further described herein. FIG. 13B is a sectional view of FIG. 13A taken along line B-B, and FIG. 13C is a sectional view of a first valve member 1323a having a grooved flow portion in accordance with an embodiment hereof. In the current embodiment transfer device 1302 is shown in the open-flow configuration, and flow portion 1366 is configured as one or more tunnel segments 1394 formed within first valve member 1323, each of which includes a first port or inlet 1395 and a second port or outlet 1396. Also, in the current embodiment, downstream end 1323a and flow portion 1366 of second valve member 1349 have a constant outer diameter therebetween with outlet 1396 being disposed to be in fluid communication with second transfer channel 1343. When first transfer member 1312 and second transfer member 1331 are in an engaged configuration, they form common transfer channel 1368 that includes first and second transfer channels 1328, 1343, and tunnel segments 1394, and when transfer device 1302 is translated to the open-flow configuration, as depicted in FIG. 13A, first valve sealing surface 1362 is disengaged from first valve seat 1363 and second valve sealing surface 1364 is disengaged from second valve seat 1365 such that downstream, end 1323a of first valve member 1323 is slidably received in receiving pocket 1367 and flow portion 1366 is positioned to allow molding material to flow into and out of tunnel segments 1394 via respective inlet 1395 and outlet 1396 so as to permit the molding material to flow within common transfer channel 1368. More particularly, inlet 1395 interfaces with first transfer channel 1328 and outlet 1396 interfaces with second transfer channel 1343 so that tunnel segments 1394 establish fluid communication between first transfer channel 1328 and second transfer channel 1343.

In the current embodiment, tunnel segments 1394 are provided in the form of enclosed passageways that extend between outside surface of first valve member 1323 from inlet 1395 to outlet 1396 by way of example and not limitation. In an another embodiment, such as depicted in FIG. 13C tunnel segments 1394c are provided in the form of one or more grooves in an outside surface of first valve member 1323c that extend from a first end to a second end.

Figure 14:
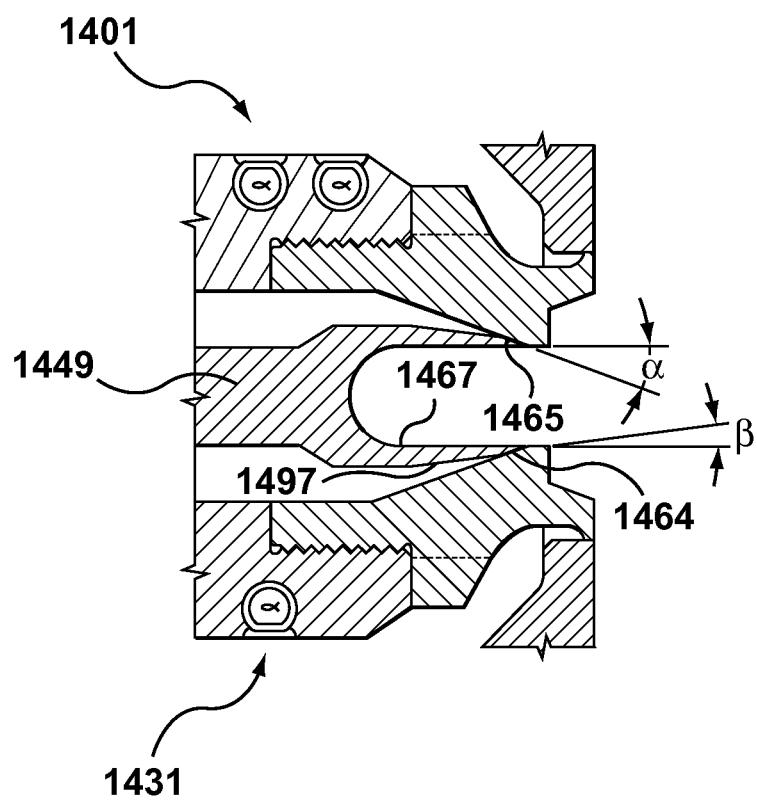
FIG. 14 is a sectional view of a portion of the second transfer member in which the second valve member has a reduced second valve sealing surface.

FIG. 14 is a sectional view of a portion of stack molding apparatus 1401 in which second valve member 1449 includes a relief taper 1497 in an outside surface of upstream end 1449a in accordance with an embodiment hereof. Features and aspects of other embodiments described herein may be used accordingly with the current embodiment and the same reference numbers are used for features of stack molding apparatus 1401 that remain unchanged from stack molding apparatus 101 and/or other embodiments described herein, as such those features are not further described herein. In the current embodiment the angle α between receiving pocket 1467 and second valve sealing surface 1464 is greater than the angle β between receiving pocket 1467 and relief taper 1497. By adding relief taper 1497 to upstream end 1449a of second valve member 1449, the contact area between second valve sealing surface 1464 of upstream end 1449a and second valve seat 1465 is reduced, which in turn reduces the volume of molding material that needs to be displaced when second valve member 1449 is actuated from the open-flow position to the closed-flow position. The result of which is that less actuator closing force is required to translate second valve member 1449 from the open-flow position to the closed-flow position. In an alternate embodiment (not shown) one or more scallops are provided on a portion of second valve sealing surface 1464 in order to reduce the size of the contact area between second valve sealing surface 1464 and second valve seat 1465 while still maintaining an uninterrupted contact area at an upstream end of second valve sealing surface 1464 between second valve sealing surface 1464 and second valve seat 1465.

In the foregoing detailed description the transfer device has been described such that the first transfer member is located in the stationary side, and is upstream from the second transfer member that is located in the moving center section by way of example and not limitation. In an embodiment (not shown), a second transfer member having a receiving pocket in an end, i.e., a downstream end, thereof may be located in the stationary side of the molding system to be disposed upstream of a first transfer member that is located in the moving center section, wherein the first transfer member has an end, i.e., an upstream end, to be received within the receiving pocket of the second transfer member.

Furthermore, in the foregoing detailed description the stack molding apparatus is a two level stack molding apparatus having a parting line $P_LA$ and a parting line $P_LB$ by way of example and not limitation. In an embodiment (not shown) the stack molding apparatus has more than two levels, and has transfer devices for transferring molding material between the levels of the stack molding apparatus. In yet a further embodiment (not shown) the stack molding apparatus is a tandem injection molding apparatus in which molding material is delivered sequentially to mold cavities at each parting line.

While various embodiments have been described above, it should be understood that they have been presented only as illustrations and examples of the present invention, and not by way of limitation. It will be apparent to persons skilled in the relevant art that various changes in form and detail can be made therein without departing from the scope of the invention. The scope of the claims should not be limited by the embodiments set forth in the examples, but should be given the broadest interpretation consistent with the description as a whole. It will also be understood that each feature of each embodiment discussed herein can be used, or adapted for use, in combination with the features of any other embodiment.

What is claimed is:

1. A stack mold transfer device actuatable between an open-flow configuration and a closed-flow configuration, the stack mold transfer device comprising:

a first transfer member having a first transfer channel, a first valve seat, and a first valve member slidably disposed within and extending through the first transfer channel, the first valve member having a flow portion and a first valve sealing surface defined along an outer circumferential length of a first end of the first valve member, with a second end of the first valve member being operably coupled to a first actuator; and a second transfer member having a second transfer channel, a second valve seat, and a second valve member slidably disposed within and extending through the second transfer channel, the second valve member having a second sealing surface and a receiving pocket extending within a first end of the second valve member, wherein the receiving pocket has an inner diameter sized to slidably receive the first valve sealing surface of the first end of the first valve member, wherein when the first transfer member and the second transfer member are in an engaged configuration the first transfer channel of the first transfer member and the second transfer channel of the second transfer member form a common transfer channel, and wherein when the transfer device is in the closed-flow configuration, the first valve sealing surface engages the first valve seat and the second valve sealing surface engages the second valve seat to block a molding material flow within the common transfer channel, and wherein when the transfer device is in the open-flow configuration the first ends of the first and second valve members are actuated to slide together into the second transfer channel, whereby the first valve sealing surface is disengaged from the first valve seat and the second valve sealing surface is disengaged from the second valve seat, whereby the first valve sealing surface surrounding the first end of the first valve member is slidably received in the receiving pocket of the second valve member to be overlapped thereby and to create a longitudinally-extending, circumferential sealing area therebetween, and whereby the flow portion of the first valve member is positioned to allow the molding material flow within the common transfer channel.

2. The stack mold transfer device according to claim 1, wherein a downstream surface of the first end of the first valve member projects beyond a transfer seal of the first transfer member when the first valve member is in a closed-flow position.

3. The stack mold transfer device according to claim 1, wherein a downstream surface of the first end of the first valve member projects beyond a transfer seal of the first transfer member and into the receiving pocket of the second valve member when the transfer device is in the closed-flow configuration, and the first transfer member and the second transfer member are in the engaged configuration.

4. The stack mold transfer device according to claim 1, wherein a gap is provided between a downstream surface of the first end of the first valve member and a bottom surface of the receiving pocket when the first transfer member and the second transfer member are in the engaged configuration, and the transfer device is in the open-flow configuration.

5. A stack mold transfer device for delivering a molding material across a parting line of a stack molding apparatus, the stack mold transfer device comprising:

a first transfer member having a first transfer channel, a first valve seat, and a first valve member slidably disposed within and extending through the first transfer channel, the first valve member having a flow portion and a first valve sealing surface defined along an outer circumferential length of a first end of the first valve member; and a second transfer member having a second transfer channel, a second valve seat, and a second valve member slidably disposed within and extending through the second transfer channel, the second valve member having a second sealing surface and a receiving pocket extending within a first end of the second valve member, wherein the receiving pocket has an inner diameter sized to slidably receive the first valve sealing surface of the first end of the first valve member, wherein when the stack molding apparatus is in a mold-closed configuration and the first transfer member and the second transfer member are in an engaged configuration, the first transfer channel and the second transfer channel form a common transfer channel, and wherein when the stack molding apparatus is in the mold-closed configuration and the transfer device is in a closed-flow configuration, the first valve sealing surface at the first end of the first valve member engages the first valve seat and the second valve sealing surface at the first end of the second valve member engages the second valve seat to block the molding material flow within the common transfer channel, and a gap is provided between a downstream surface of the first end of the first valve member and a bottom surface of the receiving pocket at the first end of the second valve member, and wherein when the transfer device is in an open-flow configuration, the first end of the first valve member is slidably received within the receiving pocket at the first end of the second valve member and the first ends of the first and second valve members so positioned slide together into the second transfer channel whereby the flow portion of the first valve member is positioned across the parting line of the stack molding apparatus to allow the molding material flow within the common transfer channel, and whereby the first valve sealing surface of the first valve member is disengaged from the first valve seat and the second valve sealing surface of the second valve member is disengaged from the second valve seat.

6. The stack mold transfer device according to claim 1, wherein one of the first valve member and the second valve member further comprises an alignment protrusion and the other of the first valve member and the second valve member further comprises an alignment socket.

7. The stack mold transfer device according to claim 6, wherein the alignment protrusion mates with the alignment socket prior to the first transfer member engaging with the second transfer member when the transfer device is translated from a disengaged configuration to the engaged configuration.

8. The stack mold transfer device according to claim 6, wherein the alignment protrusion mates with the alignment socket prior to the first end of the first valve member being slidably received in the receiving pocket of the second valve member when the transfer device is translated from the closed-flow configuration to the open-flow configuration.

9. A stack mold transfer device actuatable between an open-flow configuration and a closed-flow configuration, the stack mold transfer device comprising:

a first transfer member having a first transfer channel, a first valve seat, and a first valve member slidably disposed within and extending through the first transfer channel, the first valve member having a flow portion and a first valve sealing surface that surrounds an end of the first valve member; and a second transfer member having a second transfer channel, a second valve seat, and a second valve member slidably disposed within and extending through the second transfer channel, the second valve member having a second valve sealing surface and a receiving pocket, wherein the second valve member further comprises a vent channel in fluid communication with atmosphere that extends from the receiving pocket thereof, and wherein when the first transfer member and the second transfer member are in an engaged configuration the first transfer channel of the first transfer member and the second transfer channel of the second transfer member form a common transfer channel, and wherein when the transfer device is in the closed-flow configuration, the first valve sealing surface engages the first valve seat and the second valve sealing surface engages the second valve seat to block a molding material flow within the common transfer channel, and wherein when the transfer device is in the open-flow configuration, the first valve sealing surface is disengaged from the first valve seat and the second valve sealing surface is disengaged from the second valve seat, and the first valve sealing surface surrounding the end of the first valve member is slidably received in the receiving pocket of the second valve member, and the flow portion of the first valve member is positioned to allow the molding material flow within the common transfer channel.

10. The stack mold transfer device according to claim 9, wherein the vent channel in the second valve member is in fluid communication with a secondary vent channel in a valve bushing.

11. The stack mold transfer device according to claim 9, wherein the vent channel in the second valve member is in fluid communication with a secondary vent channel in a piston that is coupled to the second valve member.

12. The stack mold transfer device according to claim 11 further comprising:
 a check valve disposed in the vent channel or the secondary vent channel.

13. The stack mold transfer device according to claim 1 further comprising:
 a biasing member biasing the second valve member whereby the second valve sealing surface engages the second valve seat.

14. The stack mold transfer device according to claim 1, wherein a depth of the receiving pocket is sized to slidably receive a longitudinally-extending segment at the first end of the first valve member having the first valve sealing surface when the first valve member is translated, to thereby permit the first valve sealing surface to be disengaged from the first valve seat while the second valve sealing surface remains engaged with the second valve seat.

15. The stack mold transfer device according to claim 1 further comprising:
 a pin slidably disposed in the second valve member.

16. The stack molding apparatus according to claim 15, wherein the receiving pocket is defined by an inner surface of the second valve member and an end of the pin.

17. The stack mold transfer device according to claim 1, wherein the flow portion of the first valve member comprises at least one tunnel segment formed within the first valve member that has a first port defining an inlet and a second port defining an outlet.

18. The stack mold transfer device according to claim 1, wherein the second valve member includes a relief taper.

19. The stack mold transfer device according to claim 18, wherein an angle between the receiving pocket and the second valve sealing surface is greater than an angle between the receiving pocket and the relief taper.

20. The stack mold transfer device according to claim 5, wherein the downstream surface of the first end of the first valve member projects beyond a transfer seal of the first transfer member when the first valve member is in a closed-flow position.

21. The stack mold transfer device according to claim 5, wherein the downstream surface of the first end of the first valve member projects beyond a transfer seal of the first transfer member and into the receiving pocket of the second valve member when the transfer device is in the closed-flow configuration, and the first transfer member and the second transfer member are in the engaged configuration.

22. The stack mold transfer device according to claim 5, wherein a portion of the gap is maintained between the downstream surface of the first end of the first valve member and the bottom surface of the receiving pocket when the first transfer member and the second transfer member are in the engaged configuration, and the transfer device is in the open-flow configuration.

23. The stack mold transfer device according to claim 5, wherein a depth of the receiving pocket is sized to slidably receive the first end of the first valve member when the first valve member is translated, to thereby permit the first valve sealing surface to be disengaged from the first valve seat while the second valve sealing surface remains engaged with the second valve seat.

24. The stack mold transfer device according to claim 5, wherein the flow portion of the first valve member comprises at least one tunnel segment formed within the first valve member that has a first port defining an inlet and a second port defining an outlet.

* * * * *